United States Patent [19]
Litton et al.

[11] Patent Number: 5,576,715
[45] Date of Patent: Nov. 19, 1996

[54] METHOD AND APPARATUS FOR DIGITAL PROCESSING IN A GLOBAL POSITIONING SYSTEM RECEIVER

[75] Inventors: James D. Litton; Graham Russell, both of Los Angeles County; Richard K. Woo, Orange County, all of Calif.

[73] Assignee: Leica, Inc., Buffalo, N.Y.

[21] Appl. No.: 207,972

[22] Filed: Mar. 7, 1994

[51] Int. Cl.⁶ ......................................................... G01S 5/02
[52] U.S. Cl. ............................ 342/357; 342/352; 375/200
[58] Field of Search ...................................... 342/357, 352, 342/356; 375/200

[56] References Cited

U.S. PATENT DOCUMENTS

| | | | |
|---|---|---|---|
| 4,667,203 | 5/1987 | Counselman, III et al. | 342/357 |
| 4,928,106 | 5/1990 | Ashjaee et al. | 342/352 |
| 4,968,981 | 11/1990 | Sekine et al. | 342/356 |
| 4,972,431 | 11/1990 | Keegan . | |
| 5,093,839 | 3/1992 | Kohno et al. . | |
| 5,134,407 | 7/1992 | Lorenz et al. | 342/352 |
| 5,347,284 | 9/1994 | Volpi et al. | 342/356 |
| 5,414,729 | 5/1995 | Fenton | 375/209 |

OTHER PUBLICATIONS

PCT/US95/02454 Feb. 28, 1995 Corresponding PCT Appln Search Report.
Javad Ashjaee, "An Analysis of Y–Code Tracking Techniques and Associated Technologies," *Technology Analysis* Jul. 1993, pp. 26–27 and 30.
John P. Costas, "Synchronous Communications," *Proceedings of the IRE* Dec. 1956, pp. 1713–1716.

*Primary Examiner*—Thomas H. Tarcza
*Assistant Examiner*—Dao L. Phan
*Attorney, Agent, or Firm*—Flehr, Hohbach, Test, Albritton & Herbert

[57] ABSTRACT

A Global Positioning System (GPS) commercial receiver including a digital processor disposed to utilize the energy of both the L1 and L2 GPS satellite signals in order to derive an estimate of an unknown security code used to modulate the signals. In processing the signal energy from the received L1 and L2 signals in accordance with statistical Maximum A Posteriori (MAP) estimation theory, the received L1 signal is correlated with a locally generated replica of the P-code, and passed through a bandpass filter having a bandwidth approximating the bandwidth of the unknown modulation code. The received L2 signal is similarly correlated and filtered, and the decorrelated signals are then latched in such a way as to account for the differential ionospheric refraction of the L1 and L2 signals. The band-limited L2 signal is used to produce quadrature error signals related to phase difference between the L2 signal and a locally generated L2 replica. The error signals are integrated over an integration period which approximates the bit period of the unknown code, with the resulting estimates of the bits of the unknown code being combined with corresponding L1 channel code bit estimates weighted by a factor proportional to the difference in received L1 and L2 signal power. The hyperbolic tangent of each combined W-code bit estimate is then computed, with the result being multiplied by one of the integrated error signals. The resulting control voltage is then used to adjust the locally generated L2 carrier phase.

30 Claims, 26 Drawing Sheets

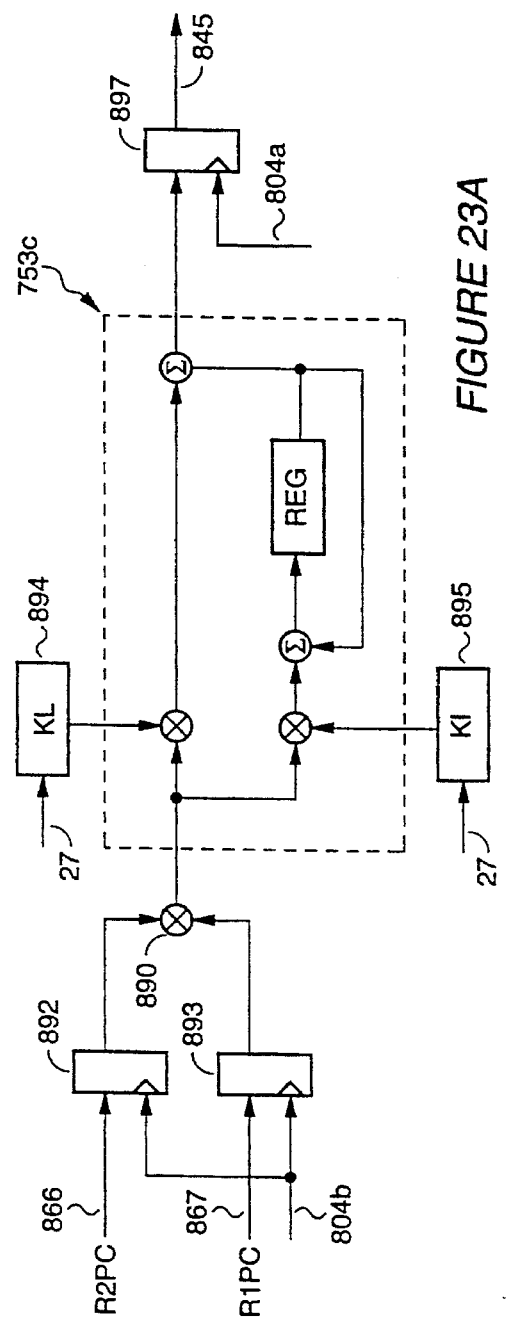
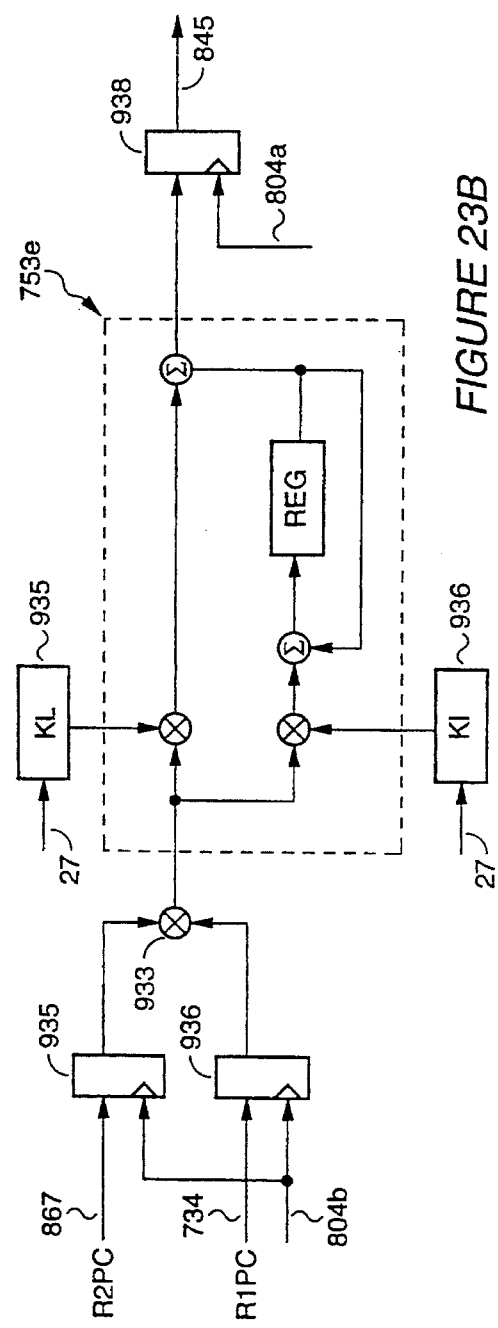

METHOD AND APPARATUS FOR DIGITAL PROCESSING IN A GLOBAL POSITIONING SYSTEM RECEIVER

The present invention relates generally to Global Positioning System ("GPS") satellite signal receivers, and, more particularly, to a novel and improved technique for digital signal processing within such receivers. In the terminology of GPS, the invention relates to a technique for obtaining code and carrier-phase measurements of suppressed carrier signals known as L1 and L2, in spite of encryption of the signals using an unknown security code.

BACKGROUND OF THE INVENTION

The global positioning system (GPS) may be used for determining the position of a user on or near the earth, from signals received from multiple orbiting satellites. The orbits of the GPS satellites are arranged in multiple planes, in order that signals can be received from at least four GPS satellites at any selected point on or near the earth.

The orbits of the GPS satellites are determined with accuracy from fixed ground stations and are relayed back to the spacecraft. In navigation applications of GPS, the latitude, longitude, and altitude of any point close to the earth can be calculated from the times of propagation of the electromagnetic signals from four or more of the spacecraft to the unknown location. A measured range, or "pseudorange", between the GPS receiver at the unknown location and the four satellites within view is determined based on these propagation times. The measured range is referred to as pseudorange because there is generally a time difference or offset between timing clocks on the satellites and a timing clock within the GPS receiver. Thus, for three-dimensional position determination at least four satellite signals are needed to solve for four unknowns, i.e., the time-offset together with the three-dimensional position.

The nature of the signals transmitted from GPS satellites is well known from the literature, but will be described briefly by way of background. Each satellite transmits two spread-spectrum signals in the L band, known as L1 and L2, with separate carrier frequencies. Two signals are needed if it is desired to eliminate an error that arises due to the refraction of the transmitted signals by the ionosphere. Each of the carrier signals is modulated in the satellite by at least one of two pseudorandom codes unique to the satellite. This allows the L band signals from a number of satellites to be individually identified and separated in a receiver. Each carrier is also modulated by a slowly-varying data signal defining the satellite orbits and other system information.

One of the pseudorandom codes is referred to as the C/A (clear/acquisition) code, while the second is known as the P (precision) code. A pseudorandom code sequence is a series of numbers that are random in the sense that knowledge of which numbers have already been received does not provide assistance in predicting the next received number. When a binary pseudorandom code, i.e., a code consisting of ones and zeroes, is used to modulate the phase of a carrier signal, the result is a signal having a spectral density that follows a $[(\sin x)/x]^2$ distribution. Because the resultant signal lacks energy at the carrier frequency and the signal energy is spread over a band of frequencies determined by the "chip" rate (i.e., the rate at which the pseudorandom binary sequence is clocked), the resultant signal is referred to as a suppressed-carrier spread-spectrum signal. One advantage of spread spectrum signals is that they are less susceptible to jamming than are signals of narrower bandwidth.

The P-code has a 10.23 MHz clock rate and is used to modulate the L1 quadrature phase and L2 in-phase carriers generated within the satellite. The P-code repeats approximately only once every week, i.e, is seven days in length. In addition, the L1 signal of each satellite includes an in-phase carrier, which is in phase quadrature with the P-code carrier, modulated by the C/A code. The C/A code has a 1.023 MHz chip rate and repeats every millisecond. Further, both carriers are modulated by the above-referenced slowly varying (50 bit per second) data stream.

In the GPS receiver, the signals corresponding to the known P-code and C/A code may be generated in the same manner as in the satellite. The L1 and L2 signals from a given satellite are demodulated by aligning the phases, i.e., adjusting the timing, of the locally-generated codes with those modulated onto the signals from that satellite. In order to achieve such phase alignment the locally generated code replicas are correlated with the received signals until the resultant output signal power is maximized. Since the time at which each particular bit of the pseudorandom sequence is transmitted from the satellite is defined, the time of receipt of a particular bit can be used as a measure of the transit time or range to the satellite. Again, because the C/A and P-codes are unique to each satellite, a specific satellite may be identified based on the results of the correlations between the received signals and the locally-generated C/A and P-code replicas.

As a consequence of the repetition of the C/A code approximately once every millisecond, correlation at the GPS receiver may be performed in the absence of precise knowledge of the time of transmission of each C/A code bit. Accordingly, acquisition of the P-code is generally accomplished by first acquiring, or "locking on" to the C/A code, since there exists a predefined timing relationship between the C/A code and P-code unique to each satellite. Once the C/A code has been acquired, the C/A-code modulated carrier component of the L1 signal may be recovered through demodulation. If extreme accuracy in the quantity being measured by the receiver is not required, use of the L1 signal carrier alone may allow for satisfactory "carrier-wave" measurements. However, when high resolution carrier-wave measurements are desired to be made, or when measurements are desired to be made quickly, the L2 carrier signal must also be utilized. That is, the unknown ionospheric delay of the L1 and L2 carriers may be eliminated when both of the L1 and L2 carriers are used.

Although both the C/A code and P-code sequences unique to each satellite are known, each GPS satellite is provided with the capability of modulating its P-code with a secret signal prescribed by the United States government. This "anti-spoofing" (A/S) allows the GPS system to be used for military applications by preventing jamming signals based on known P-codes from being interpreted as actual satellite signals. When A/S modulation is employed an additional pseudorandom code, generally referred to as the W-code, is impressed upon the P-code. The combination of the P-code and the W-code is typically referred to as the Y-code. While the C/A code and P-code unique to each satellite are publicly known, the same is not true of the W-code. From measurements using high-gain dish antennas it has been empirically determined that the W-code chip rate is approximately 500 kHz, or roughly $\frac{1}{20}^{th}$ of the P-code chip rate.

While the L1 signal includes a quadrature phase (Q) carrier modulated by the P code and in-phase (I) carrier modulated by the C/A-code, the L2 signal is modulated only by the P-code. Accordingly, when A/S is employed it would not be possible to extract the carrier from an anti-spoofed L2 signal using the correlation techniques described above. This may be appreciated by noting that the anti-spoofed L2 signal is modulated by the Y-code, and local generation of a Y-code replica within a given GPS receiver is precluded in the absence of knowledge of the secret W-code. As a consequence, a number of techniques have been suggested for obtaining access to the L2 carrier even in the presence of A/S encryption.

In a first technique the received L2 signal is multiplied by itself, or "squared", in order to eliminate its modulating terms. The squaring process results in an output signal at a single frequency even in the presence of unknown Y-code modulation, and enables subsequent phase measurement of the resultant single-frequency signal. Unfortunately, however, this squaring process is disadvantageous in at least two respects. First, the squared output frequency is twice the L2 carrier frequency, thus resulting in an output wavelength of one-half of the wavelength of the L2 carrier. As is well known, such a reduction in wavelength increases the number of whole-cycle ambiguities in carrier-wave measurements. Second, it is required that this squaring process be performed over a bandwidth encompassing a significant portion of the incident spread spectrum signal. This admits a significant level of noise energy into the receiver, thereby degrading signal to noise ratio relative to techniques of carrier frequency recovery relying on a direct correlation process.

In a second technique, commonly known as cross-correlation, the incident L2 signal is multiplied by the received L1 signal rather than being squared. This technique is premised on the knowledge that the P-code information carried by the L1 and L2 signals is synchronized at the time of transmission from a particular satellite. However, the aforementioned ionospheric refraction of the L1 and L2 signals results in a delay of L2 relative to L1. Accordingly, the P-codes on the L1 and L2 signals are aligned by adjusting a variable delay element within the L1 signal path until the output power of the cross-correlation process is maximized. Since the cross-correlation is still performed in the wide spread spectrum bandwidth, employment of this technique also results in a degraded signal to noise ratio. The degradation is somewhat less, however, as a consequence of the increased transmitted energy in the L1 signal relative to the L2 signal.

In order to reduce the signal to noise degradation inherent in the techniques described above, it has been suggested in a third technique to adjust the phase of a locally generated replica of the known P-code until a strong demodulated signal appears. This narrower bandwidth signal is then squared in order to eliminate the unknown modulation without degrading the signal to noise ratio as much as when the entire L2 signal is squared. Such a technique is described in, for example, U.S. Pat. No. 4,972,431 to Keegan (1990). Although leading to improved signal to noise ratio, the technique described by Keegan results in a doubling of the L2 frequency during the squaring process, thereby reducing the observable wavelength by one-half. Again, such a wavelength reduction results in a commensurate decrease in the number of whole-cycle ambiguities to be resolved.

In a fourth technique, described by Lorenz et al. in U.S. Pat No. 5,134,407 (1992), the L1 and L2 signals are initially correlated with locally generated P-code and carrier signals. The resultant signals are then integrated for a duration estimated to be the period of the classified W-code. Based on these integration processes separate estimates are made of the unknown W-code bit. In a particular implementation an estimated W-code bit polarity obtained on the L2 channel is cross correlated with the L1 signal after decorrelation by the P-code replica. Similarly, an estimated polarity of the W-code bit obtained on the L1 channel is cross correlated with the L2 signal after decorrelation by the P-code replica. Although allowing for improved signal to noise ratio relative to other methods of L2 carrier recovery, the method described by Lorenz does not yield optimal accuracy as a consequence of the "hard" decision made in estimating values for the individual W-code bits. That is, each bit is specifically determined to be one of two binary values by comparing the results of each integration process with a predefined threshold, thereby resulting in a less than optimal signal to noise ratio.

Accordingly, it is an object of the present invention to provide a technique of recovering, with optimal signal to noise ratio, the carrier phase of GPS signals encrypted with the classified W-code.

SUMMARY OF THE INVENTION

The present invention achieves this and other objectives by, in one aspect thereof, utilizing the energy of both the received L1 and L2 GPS signals to produce estimates of each bit of the unknown W-code, thereby allowing optimization of the signal to noise ratio of L2 carrier signals recovered during periods of W-code encryption. More particularly, signal energy from the received L1 and L2 signals is processed in accordance with statistical Maximum A Posteriori (MAP) estimation theory. This is believed to enable the achievement of optimal signal to noise ratio in the demodulation of L2 carrier signals in the absence of a priori knowledge of the polarity of each bit of the classified W-code.

In a preferred implementation the received L1 signal is correlated with a locally generated "punctual" replica of the P-code, and is also correlated with an early/late P-code formed from the difference of "early" and "late" versions of the locally generated P-code. The decorrelated outputs are passed through a bandpass filter having a bandwidth approximating the bandwidth of the encrypting W-code. The received L2 signal is similarly correlated with a locally generated punctual P-code replica and an (E-L) P-code derived therefrom, and the results bandpass filtered based on estimated bandwidth of the classified W-code. A variable delay is introduced between the decorrelated signals to account for the differential ionospheric refraction of the L1 and L2 signals. In a particular implementation the delay adjustment is performed digitally using a set of clocked latches.

Following correlation with the punctual P-code the L1 channel bandlimited signal is further demodulated using a locally generated L1 carrier, and is integrated over an integration period equivalent to the duration of a single bit of the encrypting W-code. The results of each integration, together with the bandlimited L1 signal after demodulation with both the (E-L) P-code and with the locally-generated L1 carrier, and after integration over a W-code bit period, are multiplied to produce an L1 P-code tracking signal used in controlling timing of the locally generated P-code.

With respect to L2 channel processing in the preferred implementation, the bandlimited L2 signal, after correlation with the punctual P-code, is used to produce a pair of error signals proportional to $\cos(\phi)$ and $\sin(\phi)$, respectively, where $\phi$ represents phase difference between the received L2 signal and a locally generated replica thereof. The $\cos(\phi)$ and $\sin(\phi)$ error terms are integrated over an integration period which approximates the W-bit encryption period. Each resulting estimate of a W-code bit generated on the cosine channel is combined with a corresponding L1 channel W-code bit estimate weighted by a scaling network. In the preferred implementation the scaling network multiplies the L1 channel W-code bit estimate by a weighing factor selected to compensate for the greater signal strength ($\approx$3 dB) of the received L1 signal relative to the received L2 signal. This 3 dB difference in signal energy corresponds to a weighing factor of approximately the square root of two (i.e., 1.414) within the voltage domain.

The hyperbolic tangent of each combined W-code bit estimate is then computed, with the result being multiplied by the integrated $\sin(\phi)$ error term. The resulting control voltage is used to adjust the locally generated L2 carrier phase in accordance with the phase error $\phi$. This advantageously allows, for example, a full wavelength replica of the received L2 carrier to be synthesized by a phase locked loop (PLL) carrier generation circuit. The optimal L2 carrier demodulation technique contemplated by the invention thus enables the signal to noise ratio of the recovered L2 carrier to be improved through utilization of signal energy from both the L1 and L2 channels during estimation of each bit of the encrypting W-code.

According to another aspect of the present invention, certain linear approximations are made within the preferred MAP optimal L2 carrier demodulation technique in order to allow for a simplified circuit realization. The resultant modified MAP optimal L2 carrier demodulator advantageously enables generation of a recovered L2 carrier phase at nearly the MAP optimal signal to noise ratio through the use of a simplified signal processing methodology.

More specifically, the L1 channel signal processing in the modified MAP optimal L2 demodulation technique will generally be identical to that of the processing carried out in the L1 channel using the optimal procedure described above. Signal processing on the L2 channels using each approach is also substantially identical up to the point of generation of $\cos(\phi)$ and $\sin(\phi)$ phase error terms. In each instance the error terms are integrated over the period of a single bit of the classified W-code, but in the modified demodulation technique the results of the W-code bit integrations are immediately cross-multiplied. This cross-multiplication yields an error signal proportional to $\sin(2\phi)$. The $\sin(2\phi)$ error signal is then added to the product of the weighted L1 channel estimate and the integrated $\sin(\phi)$ phase error term. This addition operation prevents the locally generated L2 carrier from becoming locked one-half carrier cycle out of phase with the received L2 carrier. In the modified technique the hyperbolic tangent function is approximated by its argument, thereby enabling employment of a much simplified circuit architecture. Accordingly, this technique allows for a substantial reduction in the number and complexity of integrated circuits in a GPS receiver.

BRIEF DESCRIPTION OF THE DRAWINGS

Additional objects and features of the invention will be more readily apparent from the following detailed description and appended claims when taken in conjunction with the drawings, in which:

FIG. 23A depicts a block diagram of an L2 carrier tracking loop network implemented in accordance with a first aspect of the invention.

FIG. 23B is a block diagram of an L2 carrier tracking loop network realized in accordance with another aspect of the invention.

DESCRIPTION OF THE PREFERRED EMBODIMENT

Organization Of the Description

I. Overview of Receiver System

II. Summary of L2 Carrier Demodulation Techniques

III. Overview of Digital Baseband Processors

IV. RF Downconversion

V. I.F. Processing

VI. L1 C/A Channel Processing

VII. L1 P-Channel Processing

VIII. L2 P-Channel Processing

IX. Detailed Description of L2 Carrier Demodulation

I. Overview of Receiver System

Figure 1:
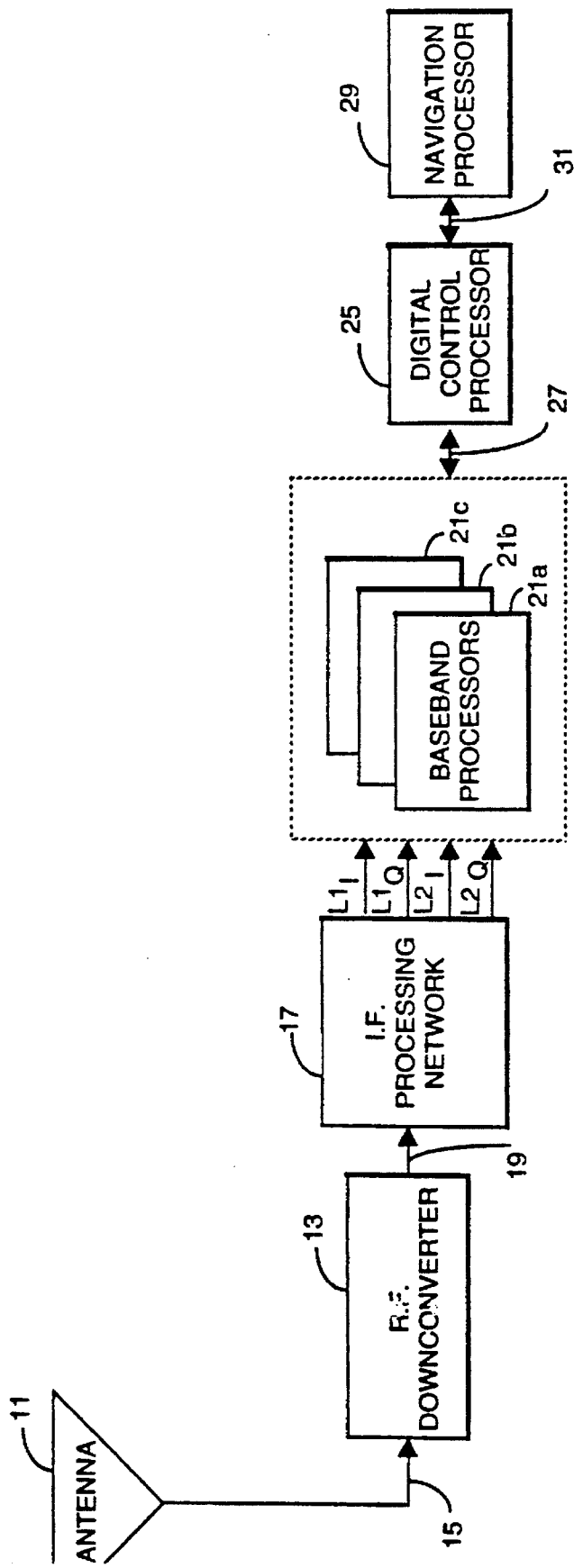
FIG. 1 shows a block diagram representation of a global positioning system (GPS) receiver configured in accordance with the invention.

Referring to FIG. 1, there is shown a block diagram representation of a global positioning system (GPS) receiver configured in accordance with the invention. As shown in FIG. 1, the L-band frequency signals simultaneously received by an antenna 11 from a plurality of GPS satellites are supplied to an R.F. downconverter 13 through a high-frequency transmission line or waveguide 15. The R.F. downconverter 13 is operative to convert the received signals to a plurality of intermediate frequency (I.F.) signals. The I.F. signals from downconverter 13 are supplied to an I.F. processing network 17 in communication with downconverter 13 by way of a coaxial cable 19 or similar transmission medium. Included within the I.F. processing network 17 are an intermediate frequency section and a set of analog-to-digital converters. The I.F. processing network provides phase quadrature digital representations of a received L1 band satellite signal, which are respectively identified hereinafter as the In-Phase ($L1_I$) and Quadrature-Phase ($L1_Q$) components of the L1 band signal. That is, a phase shift of 90 degrees exists between the digitized L1 band signals $L1_I$ and $L1_Q$. The I.F. processing network 17 similarly produces a pair of phase quadrature digital representations $L2_I$ and $L2_Q$ of the received L2 band satellite signals.

The L1 and L2 band digital outputs from the I.F. processing network 17 are supplied to a plurality of baseband processors 21a, 21b, 21c, ..., each of which is associated with a separate satellite from which a signal is received. It is understood that in alternate implementations the L1 and L2 signals may be sampled in the baseband processors 21 rather than in the I.F. processing network 17. The number of baseband processors provided is sufficient to ensure that a baseband processor is available for each received satellite signal. In an exemplary embodiment signals from four or more satellites are utilized to make a determination of the desired parameter (e.g., position, velocity or time). Each of the baseband processors 21 is capable of recognizing the digitized outputs from the I.F. processing network 17 corresponding to a particular satellite by decorrelating the I.F. outputs using locally generated replicas of the C/A and P codes unique to a given satellite.

As is indicated by FIG. 1, each baseband processor 21 communicates information derived from the digital $L1_I$, $L1_Q$, $L2_I$ and $L2_Q$ signals to a digital control processor 25 over a first bus 27. The data bus 27 is also used to relay timing and general control information from the control processor 25 to the baseband processors 21. The control processor 25 receives data and command instructions from a navigation processor 29 by way of second bus 31. The second bus 31 is also utilized to send satellite code and phase measurements, as well as to send satellite dam, from the processor 25 to the navigation processor 29. The navigation processor 29 is configured to compute the value of the desired parameter based on the information received over the second bus 31.

II. Summary of L2 Carrier Demodulation Techniques

As will be described hereinafter, each of the L2 carrier demodulation techniques of the invention relies on similar processing of the received L1 C/A code, L1 P-code and L1 carrier signals. The present invention contemplates several methods for utilizing the processed L1 code and carrier information to recover P-code and carrier phase information from the encrypted L2 signals.

The following provides a general description of the manner in which the L2 carrier demodulation techniques of the invention enable improved recovery of W-code encrypted L2 carrier signals. In order to facilitate understanding of each such demodulation technique, brief descriptions are also given of conventional methods of GPS carrier recovery.

Each of the baseband L2 carrier demodulation networks depicted in FIGS. 2–9 is assumed to be preceded by appropriate frequency conversion circuitry of the type exemplified by, for example, the R.F. downconverter 13 and I.F. processing network 17 (FIG. 1). Accordingly, the references made hereinafter to the received L1 and L2 signals, as well as to the locally generated and/or recovered L1 and L2 signals, are intended to identify the baseband L1 and L2 signal frequencies obtained subsequent to such frequency conversion. In addition, while processing of the in-phase (I) and quadrature-phase (Q) components of the received L1 and L2 signals will generally be performed in separate I and Q baseband channels, for purposes of clarity only a single such channel is described with reference to FIGS. 2–9.

As noted in the Background of the Invention, use of the P-code in recovery of a received L2 carrier signal is made more difficult by encryption of the P-code prior to carrier modulation. Since the L2 signal is modulated only with the P-code and a data signal, access to the L2 carrier using conventional correlation techniques is effectively denied during periods of P-code encryption.

Figure 2:
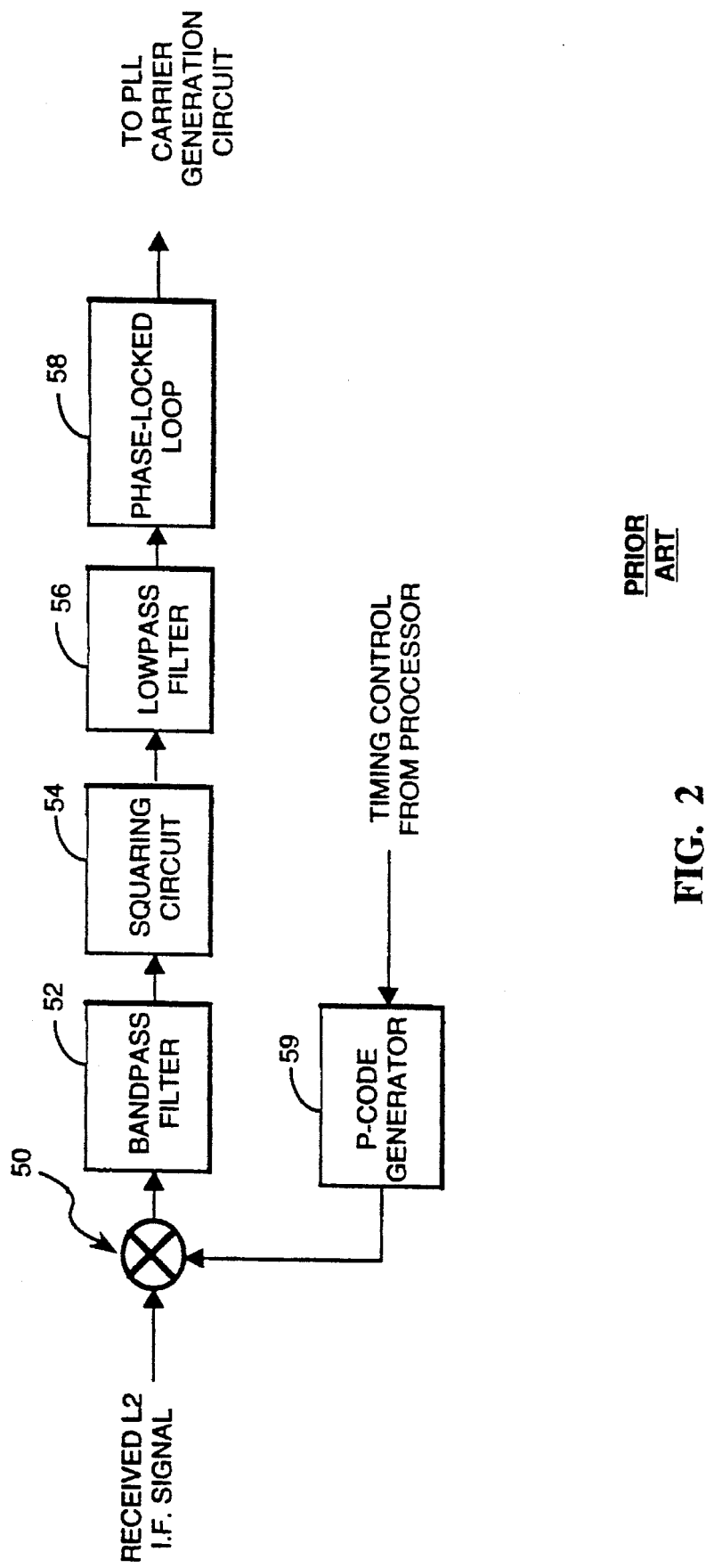
FIG. 2 depicts a first conventional GPS receiver apparatus operative to recover an encrypted L2 carrier waveform by squaring the received L2 signal following P-code correlation.

Referring to FIG. 2, the baseband section of a first conventional GPS receiver apparatus operates to recover an encrypted L2 carrier waveform by squaring the received L2 signal subsequent correlation to with a locally generated P-code signal. As is indicated by FIG. 2, the intermediate-frequency (I.F.) L2 signal is correlated with a locally-generated P-code replica using multiplier 50. Because the locally-generated P-code signal does not perfectly match the encrypted P-code sequence, the correlation does not produce a sharp peak in the frequency spectrum. The result of the correlation is filtered by a band-pass filter 52, and the reduced bandwidth signal is provided to a squaring circuit 54 for squaring. The squared signal is then passed through a low-pass filter 56, and is processed in a conventional phase-locked loop (PLL) 58 to maximize any spectral peak which does occur. A microprocessor controls the timing of P-code generator 59 in such a manner as to maximize the peak of the frequency spectrum of the signal produced by the filter 56. The output of the lowpass filter 56 is a signal having a frequency proportional to twice the L2 carrier frequency, and is provided to the PLL carrier generation circuit 58 operative to replicate the actual frequency doubled L2 carrier waveform. Unfortunately, the frequency doubling accompanying squaring of the I.F. L2 signal reduces the observable wavelength by one-half, hence increasing the number of whole-cycle ambiguities necessary to be resolved in the resulting L2 carrier measurement.

L1-L2 P-Code Aided Demodulation Using W-Code Rate Integrator.

Figure 3:
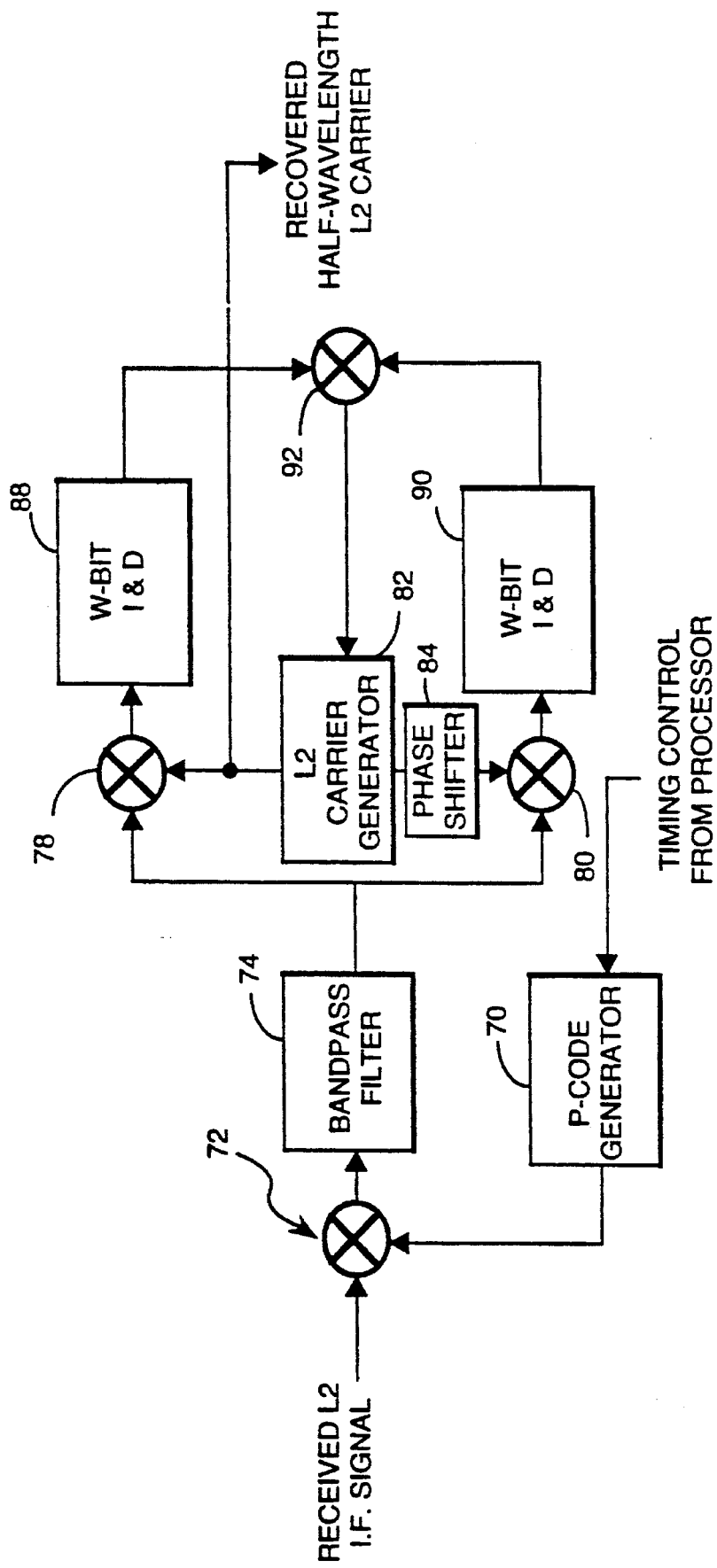
FIG. 3 is a simplified block diagram of an L2 carrier demodulation apparatus of the invention in which L2 carrier recovery is achieved exclusively through processing of W-code encrypted L2 signals.

FIG. 3 is a simplified block diagram representation of an L2 carrier demodulation apparatus which, in accordance with the invention, operates to recover the L2 carrier exclusively through processing of W-code encrypted L2 signals. The I.F. version of the received L2 signal is initially seen to be correlated with a replica of the P-code provided by an L2 P-code generator 70 at multiplier 72. The output of multiplier 72 is passed through a bandpass filter 74 having a 1 MHz bandwidth corresponding to the bandwidth of the W-code used in the P-code encryption process. The band-limited output of filter 74 is provided to multipliers 78 and 80, which are also provided with quadrature outputs of an L2 carrier generator 82. That is, multiplier 78 is coupled directly to carrier generator 82 while a 90-degree phase shifter 84 is interposed between carrier generator 82 and multiplier 80. The multipliers 78 and 80 produce error signals proportional to $\cos(\phi)$ and $\sin(\phi)$, respectively, where the parameter $\phi$ represents the phase difference between the carrier generator 82 and the I.F. version of the received L2 signal.

The $\cos(\phi)$ and $\sin(\phi)$ loop error signals are provided to first and second W-code bit integrate and dump (I&D) networks 88 and 90. The I&D networks integrate the respective error signals over an integration period which approximates the W-bit encryption period, and output the results of each integration to multiplier 92. The bit period of the W-code is not known with precision, but has been empirically determined to be equivalent to approximately 20 bit intervals of the P-code. The product of the integrated cosine and sine error signals generated by multiplier 92 yields a control signal proportional to $\sin(2\phi)$, which results in the carrier generator 82 locking up either in phase or 180 degrees out of phase with the received I.F. L2 signal. The goal of the L2 carrier demodulation apparatus of FIG. 3 is, of course, to lock the locally generated L2 carrier in phase with that of the signal being received from the satellite. When such condition exists, the phase of the locally generated carrier may be provided to the navigation processor (FIG. 1) to determine receiver position information using conventional techniques.

Figure 4:
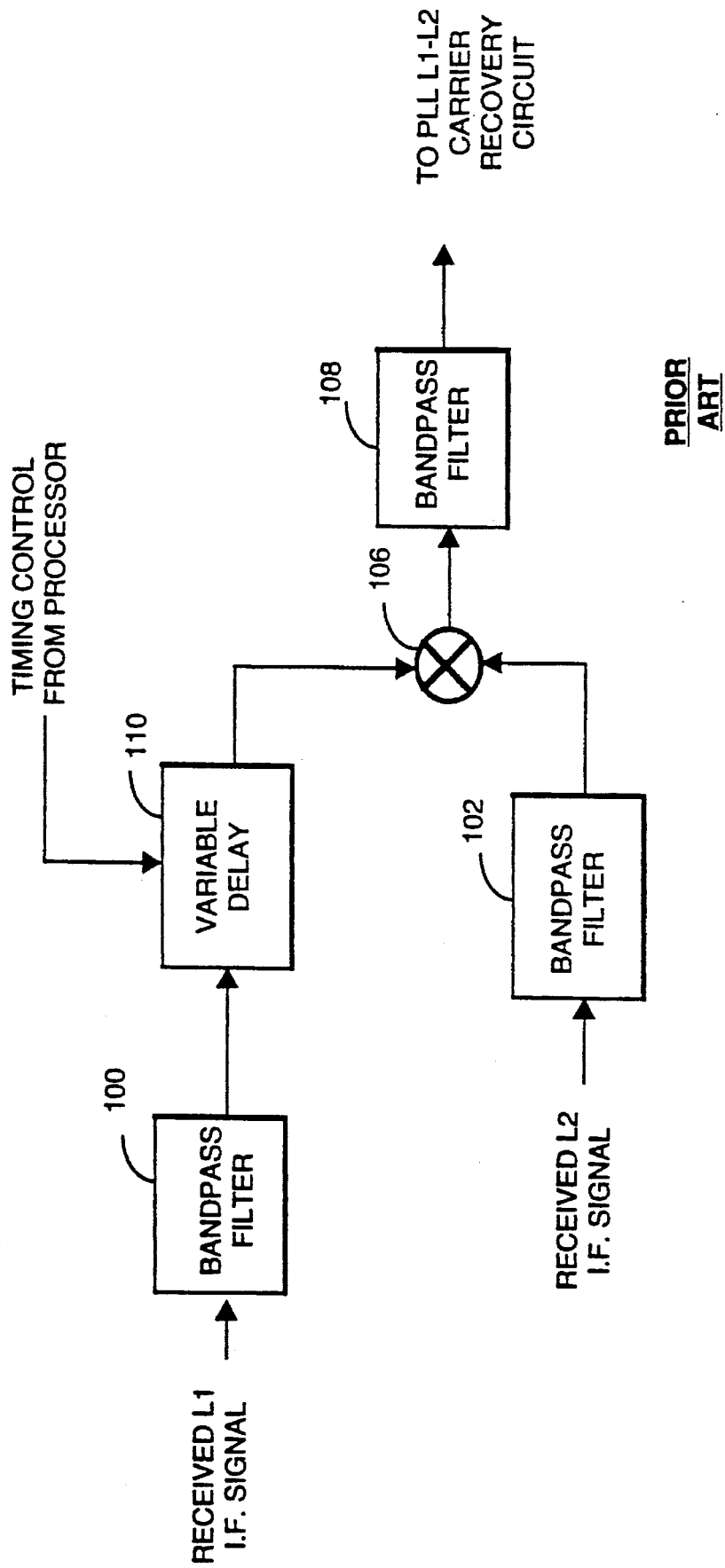
FIG. 4 is a block diagram representation of a conventional GPS baseband receiver apparatus which relies upon cross-correlation of the received L1 and L2 signals to recover the L2 carrier.

FIG. 4 is a block diagram representation of a conventional GPS baseband receiver apparatus which relies upon cross-correlation of the received L1 and L2 signals to recover a "widelane" carrier (i.e., a signal at a frequency corresponding to the difference (L1-L2) of the L1 and L2 carrier frequencies). Referring to FIG. 4, the encrypted L1 and L2 signals are passed through a pair of 20 MHz bandpass falters 100 and 102 prior to cross-correlation in multiplier 106. The L2 carrier is recovered at the output of a bandpass filter 108 operative to block signal frequencies produced by multiplier 106 not at the L1-L2 signal frequency.

The cross-correlation receiver apparatus of FIG. 4 is further seen to include a variable delay element 110 interposed between bandpass filter 100 and multiplier 106. The delay element 110 compensates for the differing degrees of ionospheric refraction experienced by the L1 and L2 signals. In order to maximize the cross-correlated output from multiplier 106, the delay introduced by delay element 110 is varied so as to align the P-code modulation impressed upon the received L1 and L2 signals. One disadvantage associated with the apparatus of FIG. 4 is that the cross-correlation operation is performed over the wide, e.g. 20 MHz, bandwidth of the received spread spectrum L1 and L2 signals. As is well known, multiplication (i.e., cross-correlation) of such wide bandwidth signals results in degradation of signal-to-noise ratio.

Code-Aided L2 Demodulation Using Cross-Correlation of L1 and L2 Signals.

Figure 5:
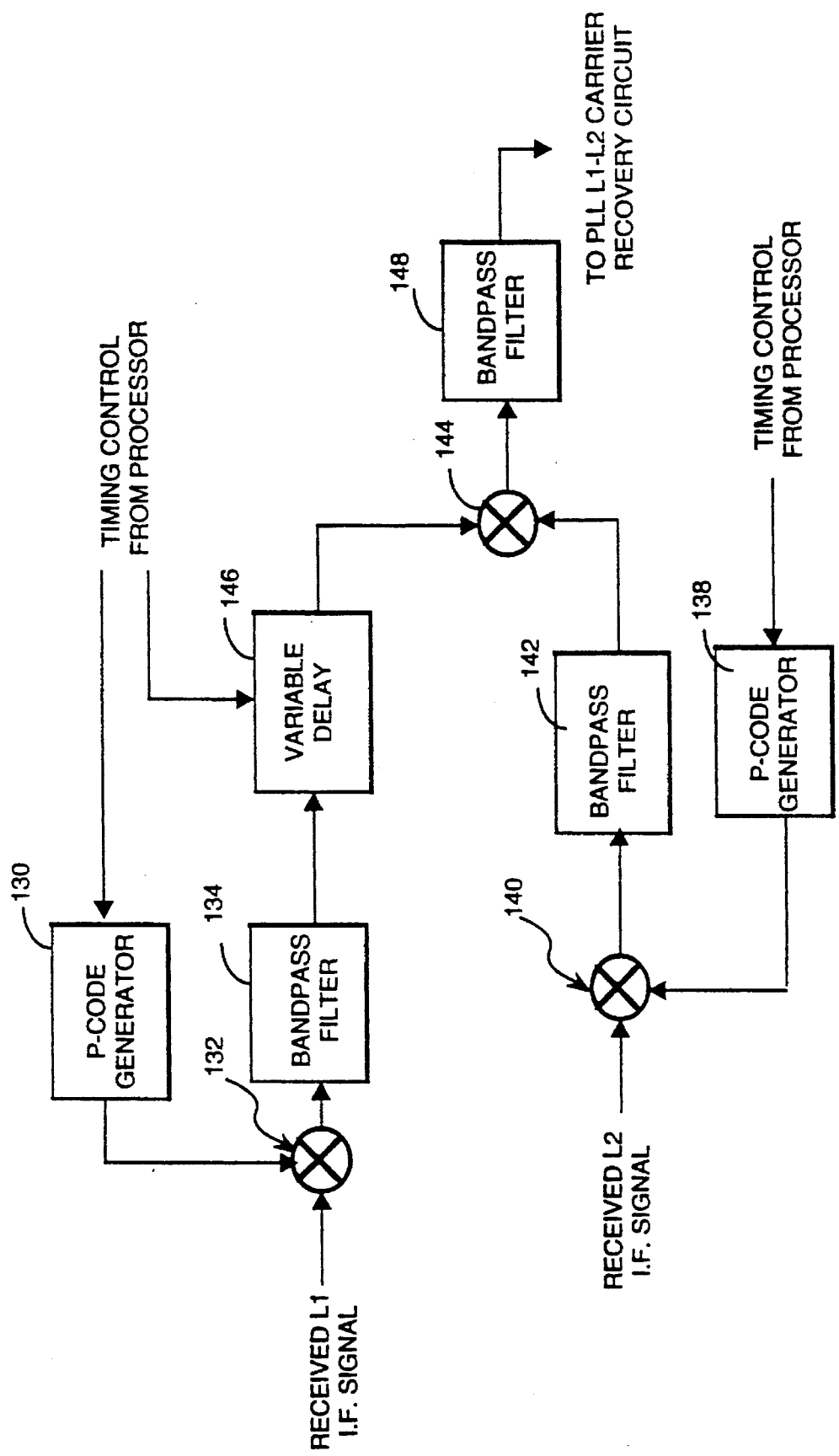
FIG. 5 provides a simplified block diagram representation of an L2 carrier demodulation apparatus of the invention disposed to recover the L2 carrier using a code-aided cross-correlation procedure.

FIG. 5 provides a simplified block diagram representation of an L2 carrier demodulation apparatus which, in accordance with the invention, is disposed to recover the L2 carrier using a code-aided cross-correlation procedure. The received L1 signal is correlated with a replica of the P-code provided by an L1 P-code generator 130 to a multiplier 132. The output of multiplier 132 is passed through a bandpass filter 134 having a 1 MHz bandwidth corresponding to the bandwidth of the W-code used in P-code encryption. Similarly, the received L2 signal is correlated with a replica of the P-code provided by an L2 P-code generator 138 to a multiplier 140. The output of multiplier 140 is passed through a 1 MHz bandpass filter 142.

Referring to FIG. 5, the bandlimited output of filter 142 is provided to multiplier 144. Multiplier 144 also receives a delayed version of the output of bandpass filter 136 from variable delay element 146. The delay introduced by delay element 146 serves to counterbalance the differential ionospheric delay experienced by the L1 and L2 signals. In particular, the delay is adjusted so as to maximize the output power of multiplier 144 and thereby align the W-code encryption carried by the L1 and L2 signals. The widelane (L1-L2) carrier may then be recovered at the output of a bandpass filter 148 centered at the L1-L2 difference frequency.

In accordance with one aspect of the invention, by first correlating the received L1 and L2 signals with locally generated versions of the P-code the cross-correlation bandwidth is reduced to 1 MHz. This results in the receiver embodiment of FIG. 5 exhibiting a significantly improved signal-to-noise ratio relative to conventional wideband cross-correlation receivers.

Figure 6:
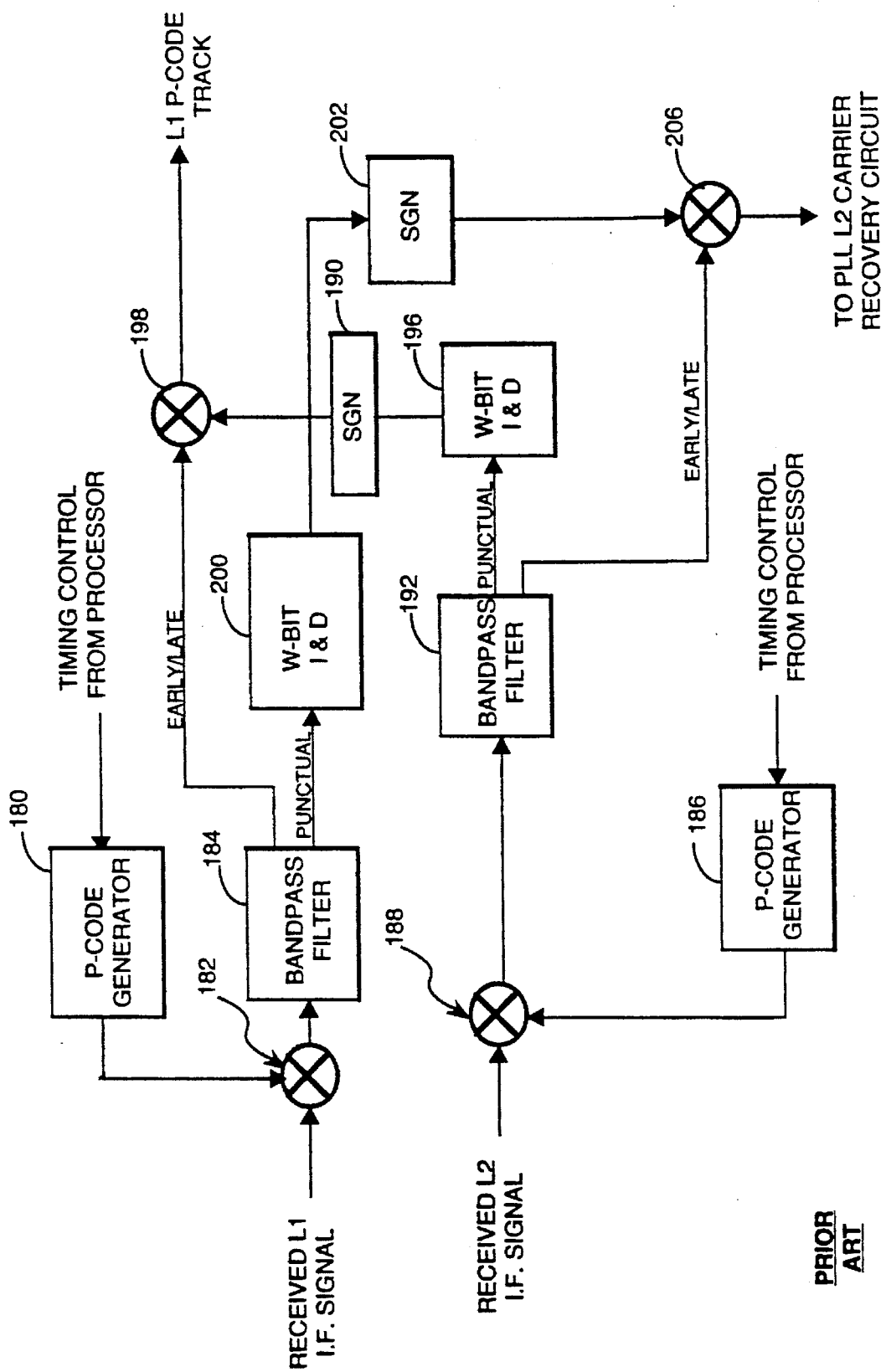
FIG. 6 provides a simplified block diagram representation of a conventional GPS baseband receiver apparatus in which an estimate of the encrypting W-code is made on a bit-by-bit hard decision basis in order to facilitate L2 carrier tracking.

FIG. 6 provides a simplified block diagram representation of a conventional GPS baseband receiver apparatus in which an estimate of the encrypting W-code is made on a bit-by-bit basis in order to facilitate L2 carrier tracking. In particular, a value is assigned to each bit of the received W-code by comparing the results of an integration of the received signal with a predefined threshold. That is, a "hard decision" is made to assign one of two binary values to each W-code bit based on the results of each integration. As is described below, the assignment of W-code bits through such a "hard-decision" process results in the loss of information, thereby reducing signal-to-noise ratio from an optimal value.

Referring to FIG. 6, the received L1 signal is correlated with a "punctual" replica of the P-code provided by an L1 P-code generator 180 at a multiplier 182. The received L1 is also correlated at multiplier 182 with an "early minus late" (E-L) version of the replicated P-code in accordance with timing information from the control processor 25. The timing of the E-L P-code is advanced or retarded from the phase of the punctual P-code so as to facilitate tracking of the P-code modulating the received L1 signal. The output of multiplier 182 is passed through a bandpass filter 184 having a 1 MHz bandwidth approximating the bandwidth of the encrypting W-code.

Similarly, the received L2 signal is correlated at multiplier 188 with a punctual replica of the P-code provided by an L2 P-code generator 186. The P-code generator 186 also provides an E-L version of the L2 P-code to the multiplier 188 for correlation with the received L2 signal. The output of the multiplier 188 is provided to a 1 MHz bandpass filter 192, the punctual output of which is integrated by a W-code bit integrate and dump (I&D) network 196 over an integration period equivalent to the duration of a single bit of the encrypting W-code. The results of each integration are latched within a sign (SGN) generator 190, in manner a described more fully below, so as to account for the differential ionospheric refraction of the L1 and L2 signals. The output of the W-bit I&D network 200 is likewise latched within the SGN generator 202 to similarly account for such differential delay.

As is indicated by FIG. 6, the polarity estimate output by the SGN generator 190, together with the E-L bandlimited L1 signal output by bandpass filter 184, are provided to a multiplier 198. The multiplier 198 produces an L1 P-code tracking signal used to control the timing of L1 P-code generator 180. The timing of the L1 P-code is adjusted to minimize the W-bit SGN adjusted E-L correlation output of multiplier 198, with the corresponding timing adjustment providing a code or "pseudorange" measurement of signal propagation delay over the L1 channel.

The conventional GPS receiver apparatus of FIG. 6 also provides for P-code tracking of the received L2 signal. In particular, the bandlimited L1 signal produced by bandpass filter 184 is integrated by a W-code bit integrate and dump (I&D) network 200 over an integration period equivalent to the W-code bit period. A polarity estimate of each W-code bit received over the L1 channel is obtained using a SIGN (SGN) function module 202, within which a hard decision is made as to the binary value (i.e. ±1) represented by the output of I&D network 200. The estimated W-bit generated by SGN module 202 of the L1 channel is cross-correlated with the bandlimited L2 signal within multiplier 206 in order to enable recovery of the full-wavelength L2 carrier signal using a phase-locked loop (PLL). It is believed that the "hard-decision" performed by SGN module 202 results in the loss of information, thereby reducing signal-to-noise ratio of the recovered L2 carrier from an optimal value.

Code-Aided L2 Demodulation Using Soft-Decision in W-Code Bit Estimation.

Figure 7:
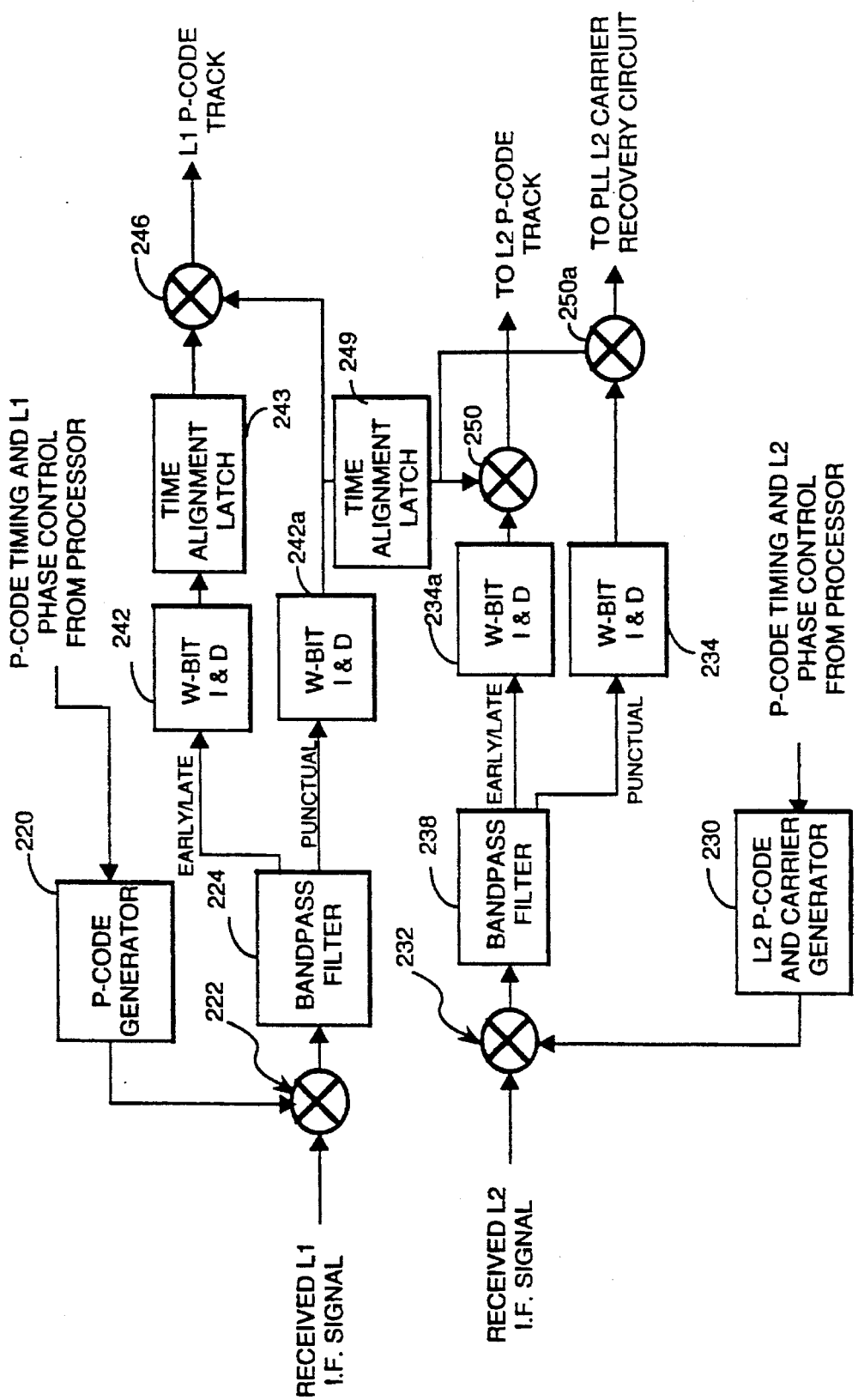
FIG. 7 provides a simplified block diagram of an inventive L2 carrier demodulation apparatus for recovering an L2 carrier by using a "soft-decision" process to estimate the value of each W-code bit received over the L1 channel.

FIG. 7 provides a simplified block diagram of an L2 carrier demodulation apparatus which, in accordance with the invention, recovers an L2 carrier by using a "soft-decision" process to estimate the value of each W-code bit received over the L1 channel. The assignment of W-code bits through such a "soft-decision" process is believed to enable the achievement of improved signal-to-noise ratio relative to that obtainable using the conventional "hard-decision" technique described above.

Referring to FIG. 7, the received L1 signal is correlated with a punctual and E-L replicas of the P-code provided by an L1 P-code generator 220 to a multiplier 222. The output of multiplier 222 is passed through a bandpass filter 224 having a 1 MHz bandwidth approximating the bandwidth of the encrypting W-code. Similarly, the received L2 signal is correlated at a multiplier 232 with punctual and E-L P-code replicas provided by an L2 P-code generator 230 to a multiplier 232.

As is indicated by FIG. 7, the E-L L1 channel bandlimited output of the filter 224 is integrated by a W-code bit integrate and dump (I&D) network 242 over an integration period equivalent to the duration of a single bit of the encrypting W-code. The results of each integration are then delayed within a time alignment latch 243 in order to account for the differential ionospheric refraction of the L1 and L2 signals. The time-aligned early/late output from time alignment latch 243, together with the punctual bandlimited L1 signal produced by bandpass filter 224, are provided to a multiplier 246.

As shown in FIG. 7, multiplier 246 produces an L1 P-code tracking signal used to control the timing of L1 P-code generator 220. The timing of the L1 P-code is adjusted to minimize the E-L correlation output at multiplier 246, with the corresponding timing adjustment providing a code or "pseudorange" measurement of signal propagation delay over the L1 channel.

In tracking of the received L2 signal, the estimated W-code bit generated by W-code bit I&D network 242a is first delayed in time alignment latch 249 and then cross-correlated with the bandlimited L2 signal within multiplier 250. This enables recovery of the full-wavelength L2 carrier signal using a phase-locked loop (PLL). As is made apparent by FIG. 7, a "hard-decision" procedure is not involved in estimating the value of each W-code bit received over the L1 channel. It is anticipated that this aspect of the L2 carrier demodulation apparatus of FIG. 7 improves the signal-to-noise ratio of the recovered L2 carrier.

An L2 channel P-code tracking signal corresponding to the product of the time-aligned signal from the W-bit I&D network 242a and the integrated L2 channel E-L P-code decorrelated signal from I&D network 234a, is seen to be produced by multiplier 250.

Optimal L2 Demodulation Motivated by Maximum-A-Posteriori (MAP) Estimation Theory.

In accordance with the invention, an L2 carrier demodulation technique has been developed in which the received L1 and L2 signals are processed in accordance with statistical Maximum A Posteriori (MAP) estimation theory. This method is believed to enable the achievement of optimal signal to noise ratio in the demodulation of L2 carrier signals even in the absence of a priori knowledge of the polarity of each bit of the encrypting W-code.

In what follows the signals processed by the L1 quadrature, L2 quadrature, and L2 in-phase channels are respectively represented by the resultant observable quantities $Q_1(t)$, $Q_2(t)$ and $I_r(t)$, which may expressed as:

$$Q_1(t) = r_1(t)P(t)\sqrt{2}\ \cos(\omega_1 t + \theta_1)|_{LP} = \sqrt{2S}\ d_k + \text{``}n_{1S}(t)\text{''} \quad (1)$$

$$Q_2(t) = r_2(t)P(t)\sqrt{2}\ \cos(\omega_2 t + \theta_2)|_{LP} = \sqrt{S}\ d_k \cos\phi + \text{``}n_{2S}(t)\text{''} \quad (2)$$

$$I_2(t) = r_2(t)P(t)\sqrt{2}\ \sin(\omega_2 t + \theta_2)|_{LP} = \sqrt{S}\ d_k \sin\phi + \text{``}n_{2C}(t)\text{''} \quad (3)$$

The following is pertinent to the notation employed in equations (1)–(3):

(i) the received L1 and L2 signals are denoted by $r_1$ and $r_2$, are of signal power $2S$ and $S$, and are of nominal radian frequencies $\omega_1$ and $\omega_2$, respectively;

(ii) the noise received over the L1 quadrature, L2 quadrature, and L2 in-phase channels is represented as $n_{1S}$, $n_{2S}$, $n_{2C}$, and is assumed be zero mean white gaussian noise having a power spectral density of $N_0/2$;

(iii) the value (+/−1) of a single bit of the W-code is represented as $d_k$;

(iv) the locally-generated estimate of the P-code is represented by P(t);

(v) $\theta_1$ and $\theta_2$ denote the locally-generated phase estimates of the received L1 and L2 signals;

(vi) $\phi$ represents the phase error between the locally-generated estimate of the demodulated L2 carrier and the actual L2 carrier phase of the received L2 signal $r_2$; and (vii) the notation "LP" denotes the low-pass components of the observable quantities $Q_1(t)$, $Q_2(t)$ and $I_2(t)$.

In equations (1)–(3) it is assumed that tracking on the L1 C/A channel allows the locally-generated L1 carrier phase $\theta_1$ to be phase-locked with the received L1 carrier phase. In addition, equations (1)–(3) presuppose that the L1 signal power (2S) is nominally 3 dB greater than the L2 signal power (S).

The joint Gaussian probability density function of the observable signal quantities $Q_1(t)$, $Q_2(t)$ and $I_2(t)$, conditioned on the phase error $\phi$ and the W-code bit data polarity $d_k$, is given by:

$$p[Q_1, Q_2, I_2|\phi, d_k] = A\exp\left[\frac{2}{N_0}\sum_{j=1}^{m}(Q_1(t_j)\sqrt{2S}\,d_k + Q_2(t_j)\sqrt{S}\,d_k\cos\phi + I_2(t_j)\sqrt{S}\,d_k\sin\phi)\right] \quad (4)$$

where cosh denotes the hyperbolic cosine function. where m represents a number of samples of the received L1 and L2 signals $r_1$ and $r_2$ accumulated over the duration of a single bit of the unknown security code, and A is a constant independent of the desired phase estimate $\theta_2$ and data $d_k$. Assuming that the W-code is statistically independent on a bit-by-bit basis, and that there exists an equal probability that each W-code bit ($d_k$) of the W-code is +1 or −1, averaging equation (4) over one W-code bit period yields:

$$p[Q_1, Q_2, I_2|\phi] = A\cosh\left[\frac{2}{N_0}\sum_{j=1}^{m}(Q_1(t_j)\sqrt{2S} + Q_2(t_j)\sqrt{S}\cos\phi + I_2(t_j)\sqrt{S}\sin\phi)\right] \quad (5)$$

The MAP (Maximum A Posteriori) estimator $\theta_2$ of the L2 carrier phase can be obtained by finding a local maximum of the joint probability function of equation (5) with respect to the phase estimate $\theta_2$. Hence, the phase estimate $\theta_2$ must satisfy the following equation:

$$0 = \frac{\partial}{\partial \phi} p[Q_1, Q_2, I_2|\phi] \quad (6)$$
$$= A\sinh\left[\frac{2}{N_0}\sum_{j=1}^{m}\{Q_1(t_j)\sqrt{2S} + Q_2(t_j)\sqrt{S}\cos\phi + I_2(t_j)\sqrt{S}\sin\phi\}\right] \times \sum_{j=1}^{m}\{-Q_2(t_j)\sqrt{S}\sin\phi + I_2(t_j)\sqrt{S}\cos\phi\}$$

where sinh denotes the hyperbolic sine function. Reverting the sampled data expression of equation (6) to analog form yields:

$$0 = A\sinh\left[\frac{2}{N_0}\int_{kT}^{(k+1)T} r_1(t)\sqrt{4S}\,P(t)\cos(\omega_1 t + \theta_1)dt + \frac{2}{N_0}\int_{kT}^{(k+1)T} r_2(t)\sqrt{2S}\,P(t)\cos(\omega_2 t + \theta_2)dt\right] \times \frac{2}{N_0}\int_{kT}^{(k+1)T} r_2(t)\sqrt{2S}\,P(t)\sin(\omega_2 t + \theta_2)dt \quad (7)$$

The phase estimate $\theta_2$ may alternately be determined by maximizing the natural logarithm of equation (5). This results in the following equation:

$$0 = A\tanh\left[\frac{2}{N_0}\int_{kT}^{(k+1)T} r_1(t)\sqrt{4S}\,\cos(\omega_1 t + \theta_1)dt + \frac{2}{N_0}\int_{kT}^{(k+1)T} r_2(t)\sqrt{2S}\,\cos(\omega_2 t + \theta_2)dt\right] \times \frac{2}{N_0}\int_{kT}^{(k+1)T} r_2(t)\sqrt{2S}\,\sin(\omega_2 t + \theta_2)dt \quad (8)$$

Figure 8:
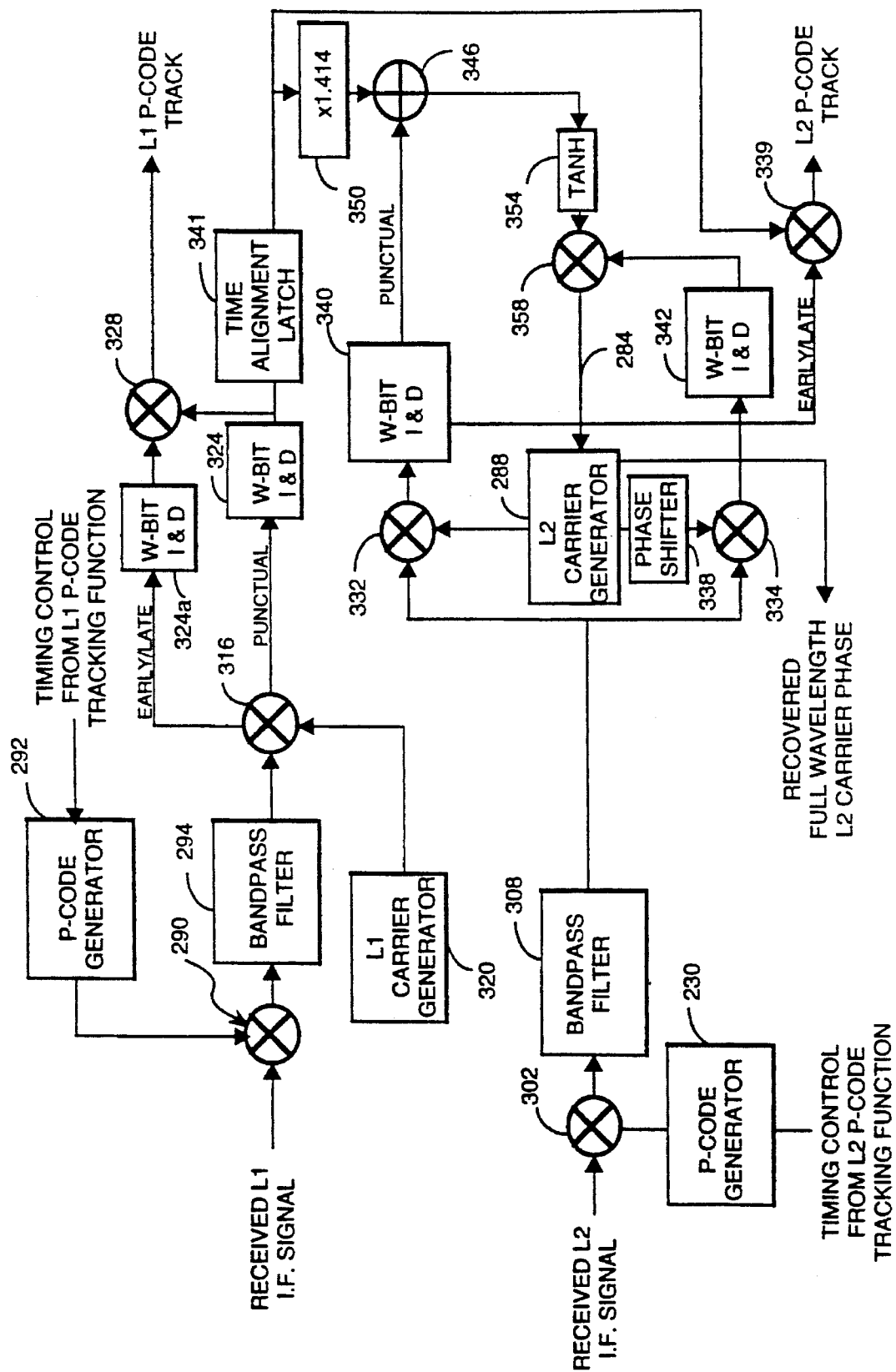
FIG. 8 shows a block diagram of an L2 carrier demodulator of the invention enabling optimal carrier recovery in accordance with statistical Maximum A Posteriori (MAP) estimation theory.

Turning now to FIG. 8, there is shown a MAP optimal L2 carrier demodulator realized on the basis of equation (8). Such a demodulator may be implemented using a closed loop circuit architecture disposed to drive the quantity specified by equation (8) to zero through proper adjustment of the local phase estimate $\theta_2$. In this regard the MAP optimal L2 demodulator of FIG. 8 may be characterized as including a feedback loop circuit implementation of the loop error function inherent within equations (6), (7), and (8). In accordance with the invention, the value of a control voltage 284 is seen to be determined by a combination of two product signals, and is used to drive the baseband L2 carrier generator 288 in phase of with the baseband version of the encrypted L2 carrier.

Referring now to FIG. 8, the received L1 signal is correlated, by a multiplier 290, with punctual and E-L P-code replicas provided by an L1 P-code generator 292. The output of multiplier 290 is passed through a bandpass filter 294 having a 1 MHz bandwidth approximating the bandwidth of the encrypting W-code. Similarly, the received L2 signal is correlated with punctual and E-L P-code replicas, provided by an L2 P-code generator 298, within a multiplier 302. The output of the multiplier 302 is then filtered by a 1 MHz bandpass filter 308.

As is indicated by FIG. 8, the L1 channel bandlimited output of the filter 294 is decorrelated by a multiplier 316 using the quadrature (cosine) component of the L1 carrier provided by an L1 carrier generator 320. As is described below in sections V and VI, the phase of the L1 carrier generator 320 is determined by an L1 carrier track signal derived from tracking of the L1 carrier on the L1 C/A-channel. The punctual and E-L decorrelated outputs produced by the multiplier 316 are integrated by W-code bit integrate and dump (I&D) networks 324 and 324a over an integration period equivalent to the duration of a single bit of the encrypting W-code. The results of each integration, together with the bandlimited L1 signal output by bandpass filter 294, are provided to a multiplier 328. As shown in FIG. 8, multiplier 328 produces an L1 P-code tracking signal used to control the timing of L1 P-code generator 292. The timing of the L1 P-code is adjusted to minimize the product of the punctual and E-L W-bit I&D signals at the output of multiplier 328, with the corresponding timing adjustment providing a code or "pseudorange" measurement of signal propagation delay over the L1 channel.

With respect to L2 channel processing, the bandlimited output of filter 308 is seen to be provided to multipliers 332 and 334. The multipliers 332 and 334 are respectively provided with quadrature outputs of the baseband L2 carrier generator 288. As is indicated by FIG. 8, multiplier 332 is coupled directly to carrier generator 288 while a 90-degree phase shifter 338 is interposed between L2 carrier generator 288 and multiplier 334. The multipliers 332 and 334 produce error signals proportional to $\cos(\phi)$ and $\sin(\phi)$, respectively, where $\phi$ represents the phase difference between the carrier generator 288 and the I.F. version of the received L2 signal. An L2 P-code track signal is seen to be provided to the P-code generator 298 by a multiplier 339. In the preferred embodiment the multiplier 339 is disposed to multiply the punctual L1 channel W-code bit estimate produced by the I&D network 324 with the early/late L2 channel cosine error term output by multiplier 332. A time alignment latch 341 is clocked so as to compensate for the differential ionospheric delay between the L1 and L2 signals.

The $\cos(\phi)$ and $\sin(\phi)$ error terms are provided to first and second W-code bit integrate and dump (I&D) networks 340 and 342. The I&D networks integrate the loop error signals over an integration period which approximates the W-bit encryption period. However, in contrast to the demodulation technique of the invention described with reference to FIG. 3, the results of the W-code bit integrations are not directly multiplied so as to provide a control signal proportional to the sine of twice the phase error $\phi$. Rather, the results of the integration performed by the I&D network 340 on the cosine channel are processed further so as to enable full wavelength L2 carrier recovery. In particular, each L2 channel estimate of a W-code bit provided by the I&D network 340 is combined by an adder 346 with a corresponding L1 channel W-code bit estimate weighted by a scaling network 350. In the preferred embodiment the scaling network 350 multiplies the L1 channel W-code bit estimate by a weighing factor selected to compensate for the greater signal strength ($\approx 3$ dB) of the received L1 signal relative to the received L2 signal. This 3 dB difference in signal energy corresponds to a weighing factor of approximately the square root of two (i.e., 1.4) within the voltage domain.

The output of the adder 346 is processed by a TANH circuit 354 designed to compute the hyperbolic tangent of each combined W-code bit estimate. The resulting hyperbolic tangent signal represents the optimal non-linear response of the L2 cosine channel to variations in signal strength. As is indicated by FIG. 8, a multiplier 358 is provided for multiplying the output of the TANH circuit 354 by the integrated sine component of the phase error produced by the I&D network 342. As a consequence of the L2 channel processing in accordance with a hyperbolic tangent function, the control voltage 284 generated by the multiplier 358 is proportional to the phase error $\phi$ rather than to $2\phi$. It follows that the control voltage 284 will cause the output phase of the L2 carrier generator 288 to be synchronous with the full wavelength phase of the received L2 carrier. This allows a full wavelength replica of the received L2 carrier to be synthesized by a phase locked loop (PLL) carrier generation circuit (not shown). The MAP optimal L2 carrier demodulator of FIG. 8 is believed to improve the signal to noise ratio of the recovered L2 carrier by utilizing signal energy from both the L1 and L2 channels in estimation of each bit of the encrypting W-code.

Modified Maximum-A-Posteriori (MAP) Optimal L2 Demodulation.

Figure 9:
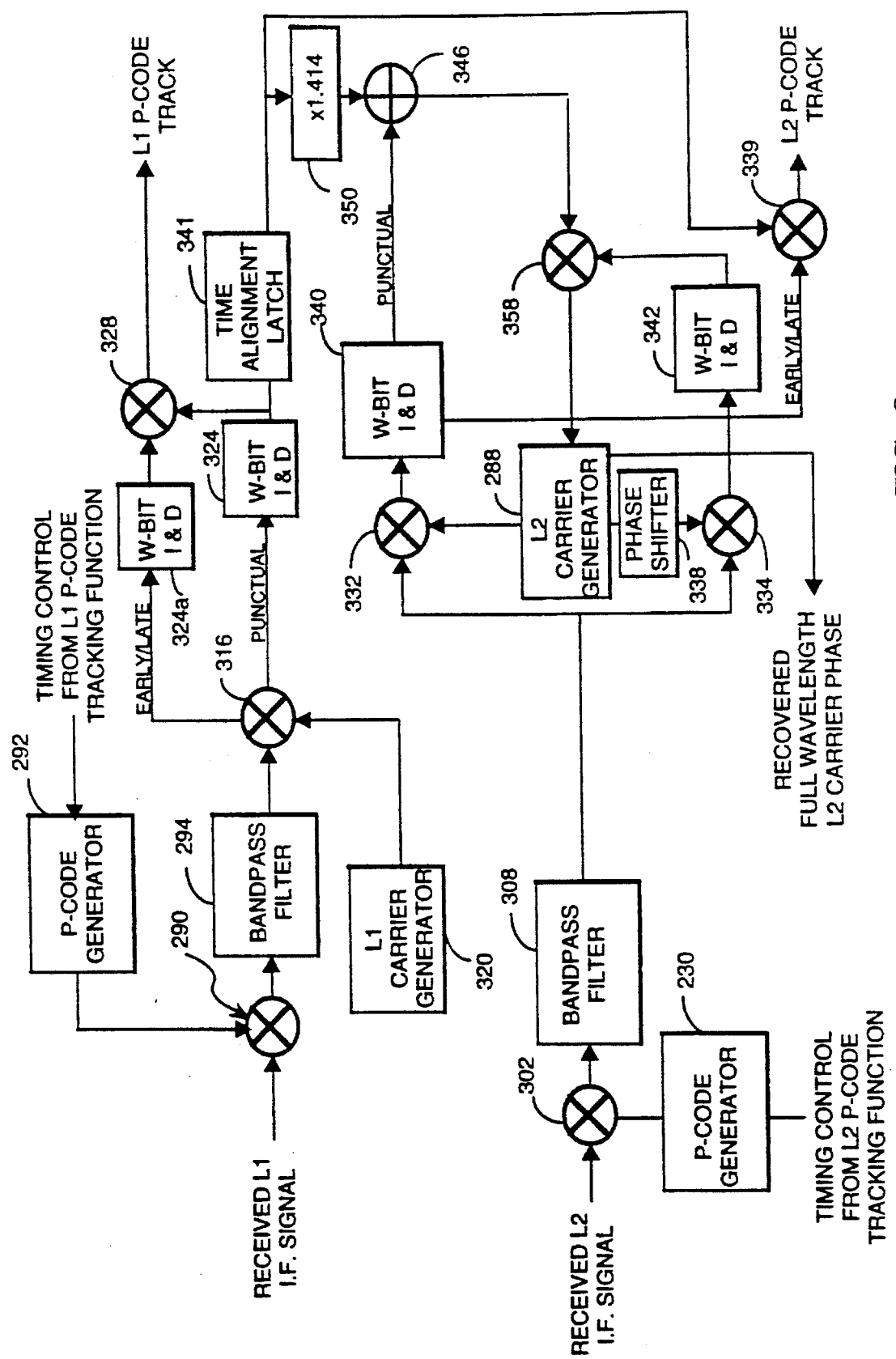
FIG. 9 depicts a block diagram of a simplified implementation of the optimal MAP L2 carrier demodulator of FIG. 8.

Referring to FIG. 9, there is shown a simplified implementation of the MAP optimal L2 carrier demodulator of FIG. 8. The modified MAP optimal L2 carrier demodulator of FIG. 9 advantageously enables generation of a recovered L2 carrier phase at nearly the statistical MAP optimal signal to noise ratio, yet may be realized in a substantially simpler manner. Like reference numerals are utilized in FIGS. 8 and 9 in the representation of equivalent circuit elements.

Referring to FIG. 9, the L1 channel signal processing in the modified MAP optimal L2 demodulator is seen to be identical to that of the processing carried out in the L1 channel of the optimal L2 demodulator of FIG. 8. Similarly, signal processing on the L2 channels of the demodulators of FIGS. 8 and 9 is substantially identical through the generation of $\cos(\phi)$ and $\sin(\phi)$ error terms by the multipliers 332 and 334. In each instance the error terms are provided to first and second W-code bit integrate and dump (I&D) networks 340 and 342. However, in contrast to the MAP optimal demodulation technique described with reference to FIG. 8, in the modified technique exemplified by FIG. 9 a hyperbolic tangent computation is not performed.

As is indicated by FIG. 9, the output of adder 346 is provided to a multiplier 358. The multiplier 358 is operative to generate the product of the output of W-bit I&D network 342, which is proportional to $\sin(\phi)$, with:

(i) the weighted L1 channel estimate of the W-code bit produced by the scaling network 350; and (ii) the output of the I&D network 340, which is proportional to $\cos(\phi)$. The resultant product terms are proportional to $\sin(\phi)$ and $\sin(2\phi)$, and advantageously prevent the feedback loop from becoming locked one-half cycle out of phase with the received L2 carrier. The implementation of FIG. 9 may be characterized as a linear approximation of the MAP optimal L2 demodulator of FIG. 8. That is, the hyperbolic tangent function (FIG. 8) is approximated by its argument within the modified implementation of FIG. 9. It is anticipated that the simplified circuit realization made possible by this linear approximation will, like the theoretically optimal implementation of FIG. 8, also advantageously provide a much improved signal to noise ratio relative to conventional techniques.

III. Overview of Digital Baseband Processors.

Figure 10:
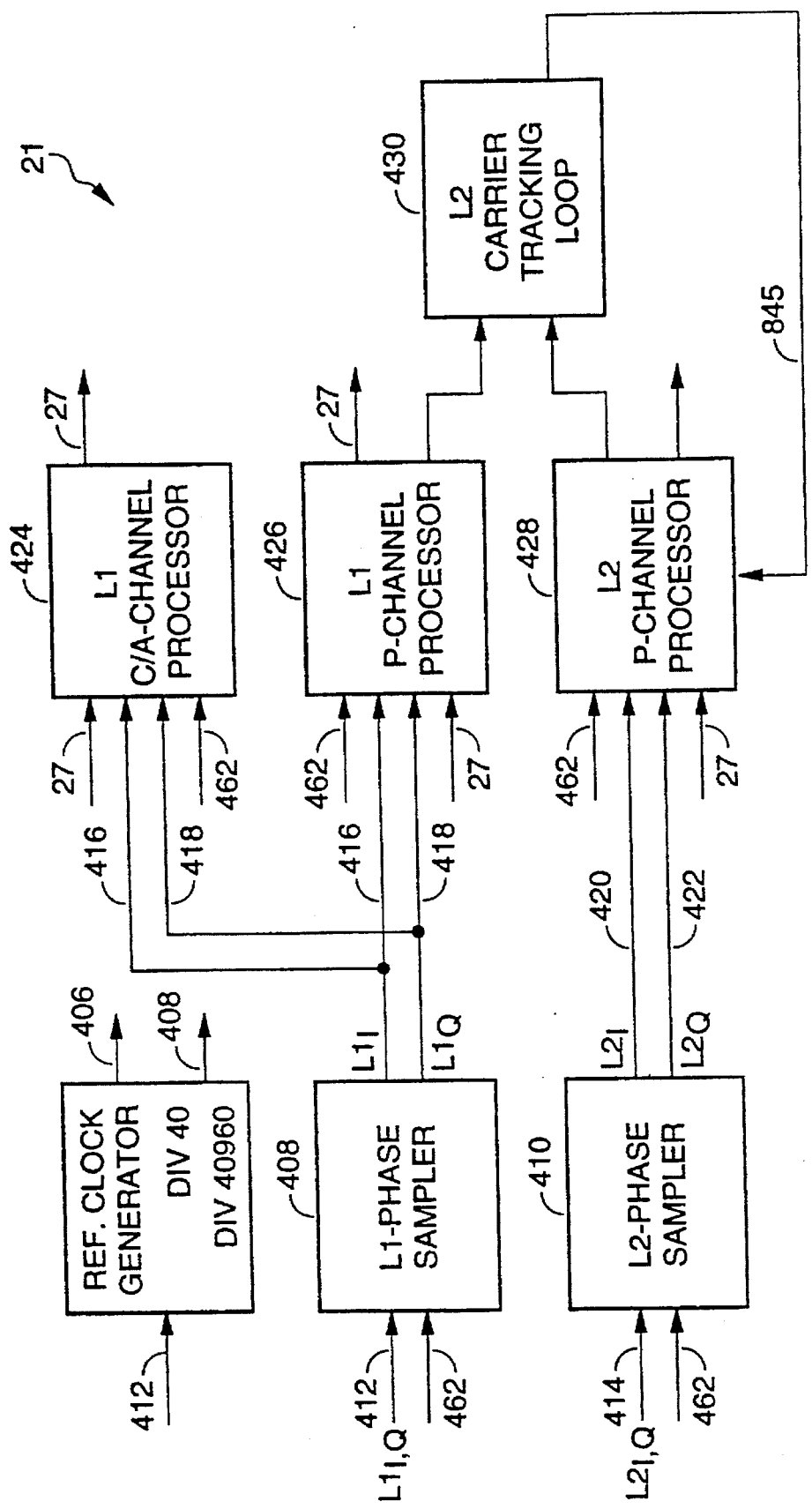
FIG. 10 provides a block diagram representation of a digital baseband processor disposed to process the L1 and L2 signals received from a particular GPS satellite.

FIG. 10 is a simplified block diagram of an exemplary one of the digital baseband processors 21 (FIG. 1). The primary signal processing functions performed by each digital baseband processor are:

(i) correlation of the digitized L1 and L2 quadrature data received from the I.F. processing network 17 with locally generated replicas of the C/A and P codes of a particular satellite, and (ii) processing of the received L1 and L2 signals to provide a number of observable data outputs to the digital processor 17 over the first data bus 27.

Referring to FIG. 10, the digital baseband processor 21 includes a reference clock generator 402 disposed to receive a reference clock signal impressed on line 462 by a temperature-controlled crystal oscillator (TXCO). In an exemplary implementation the reference clock signal is at a frequency of 40.96 MHz. Clock generator 402 divides the frequency of the signal on line 462 by a factor of 40 and by a factor of 40960 to generate signals of approximately 1 MHz and 1 kHz, which are respectively provided on clock lines 406 and 408. The clock lines 406 and 408 provide a time base for measurements performed within the digital baseband processor 21, as well as for signal processing within other sections of the receiver of FIG. 1.

In the embodiment of FIG. 10 the digital baseband processor 21 receives control data on bus 27 from the digital processor 25 enabling the execution of various signal processing functions. For example, the control data provided over bus 27 facilitates local generation of the P-code, C/A-code, and carrier phase associated with each satellite. The control data also serves to sequence the various data processing operations performed by the baseband processor 21.

As is indicated by FIG. 10, the L1 and L2 quadrature signals from the I.F. processing network are received by L1 and L2 phase sampling circuits 408 and 410 in the form of serial binary data on processor input lines 412 and 414, respectively. The sampling circuits 408 and 410 separates the serial data on input lines 412 and 414 into the quadrature components L1-I, L1-Q, L2-I and L2-Q impressed on baseband L1 channel lines 416 and 418, and upon baseband L2 channel lines 420 and 422, respectively. Unless indicated otherwise, the L1 and L2 channel signal lines depicted in FIGS. 10–16 are assumed to be implemented using 4-wire transmission lines capable of carrying 4-bit signal data.

Each digital baseband processor 21 is seen to include an L1-CA channel processing circuit 424, an L1 P-channel processing circuit 426, an L2 P-channel processing circuit 428, and an L2 carrier tracking loop 430. As is described hereinafter, the signal processing operations performed by the baseband circuits 424, 426, 428 and 430 enable optimal demodulation of encrypted L2 signals in accordance with the invention. A detailed description of the baseband circuits 424, 426, 428 and 430 is provided below with reference to FIGS. 13–16, respectively.

IV. RF Downconversion

Figure 11:
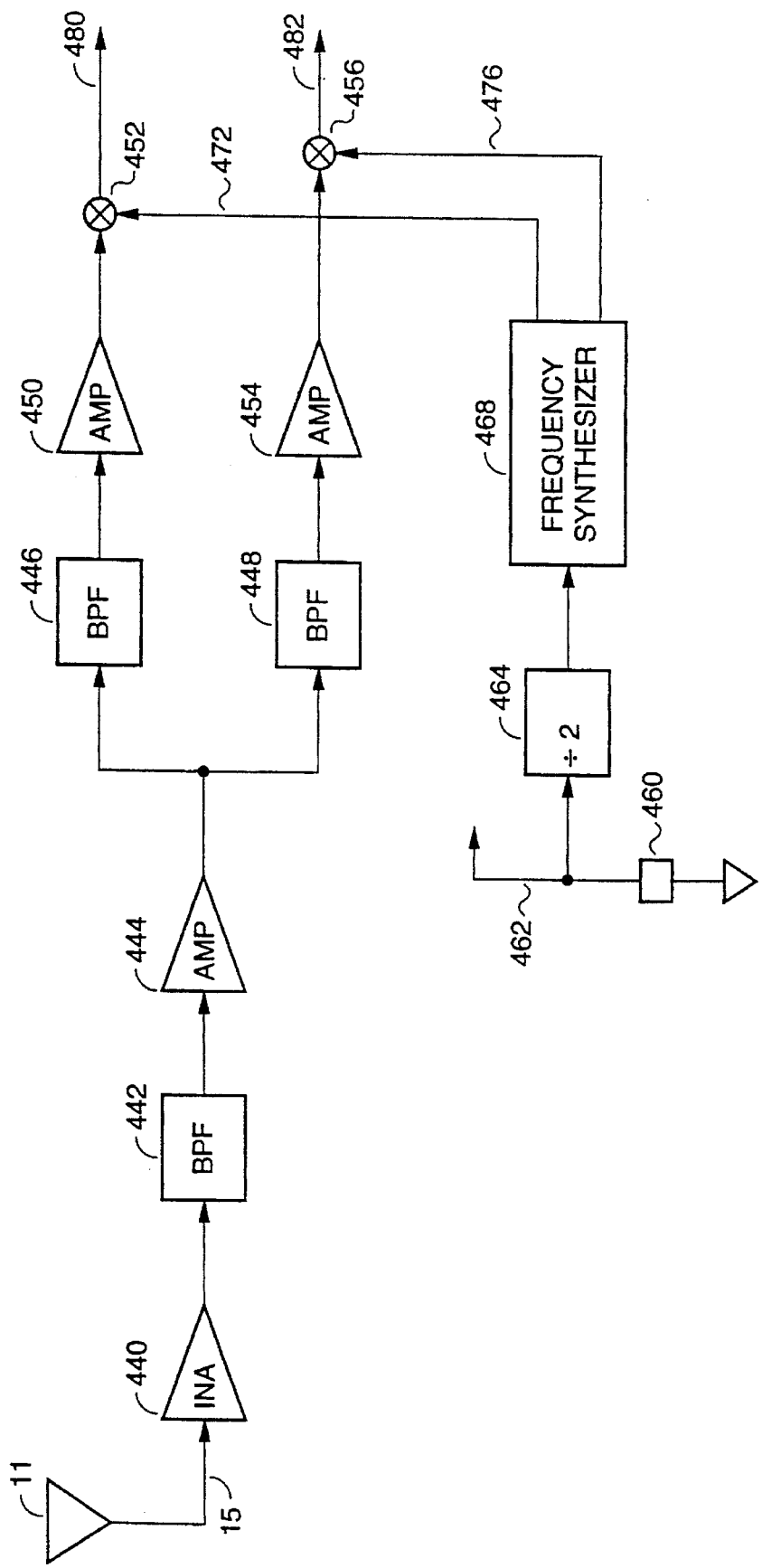
FIG. 11 is a block diagram of an exemplary RF downconverter for inclusion within a GPS receiver.

Turning now to FIG. 11, the RF downconverter 13 is depicted in greater detail. The signals received by the antenna 11 are carded by the high frequency transmission line 15 to a low noise amplifier 440, the output of which is filtered by a first RF bandpass filter 442. In an exemplary implementation the bandpass filter 442 has a bandwidth of 400 MHz and a center frequency of 137 fo, where fo=10.23 MHz. The output of the bandpass filter 442 is further amplified by a first RF amplifier 444 before being supplied to L1 and L2 channel bandpass filters 446 and 448 for separating the received signals into the L1 and L2 frequency bands, respectively. The bandpass filters 446 and 448 both have a bandwidth of 80 MHz, with the center frequency of the L1 channel filter 446 being fixed at 154 fo and the center frequency of the L2 channel filter 448 being fixed at 120 fo. The L1 signal from the filter 446 is then amplified by an L1 channel RF amplifier 450 before being supplied to an L1 channel mixer 452. Similarly, the L2 signal from the filter 448 is amplified by an L2 channel RF amplifier 454 prior to being provided to an L2 channel mixer 456.

As shown in FIG. 11, a Temperature Compensated Crystal Oscillator (TXCO) 460 supplies a reference frequency of fs on reference line 462. In an exemplary implementation the reference frequency fs is approximately equal to 40.96 MHz, and is divided by two within a divider circuit 464 before being provided to a frequency synthesizer 468. The frequency synthesizer 468 operates in a conventional manner to generate an LO1 signal of frequency 1503.84 MHz on line 472 and an LO2 signal of frequency 1156.0 MHz upon line 476. The mixer 452 uses the LO1 signal to downconvert the L1 signal from that provided by amplifier 450 to an L1 intermediate frequency (I.F.) signal on a first RF output line 480. Similarly, the mixer 456 utilizes the LO2 signal impressed upon line 476 to downconvert the L2 channel signal produced by the amplifier 454 to an L2 I.F. frequency signal on a second RF output line 482.

V. I.F. Processing

Figure 12:
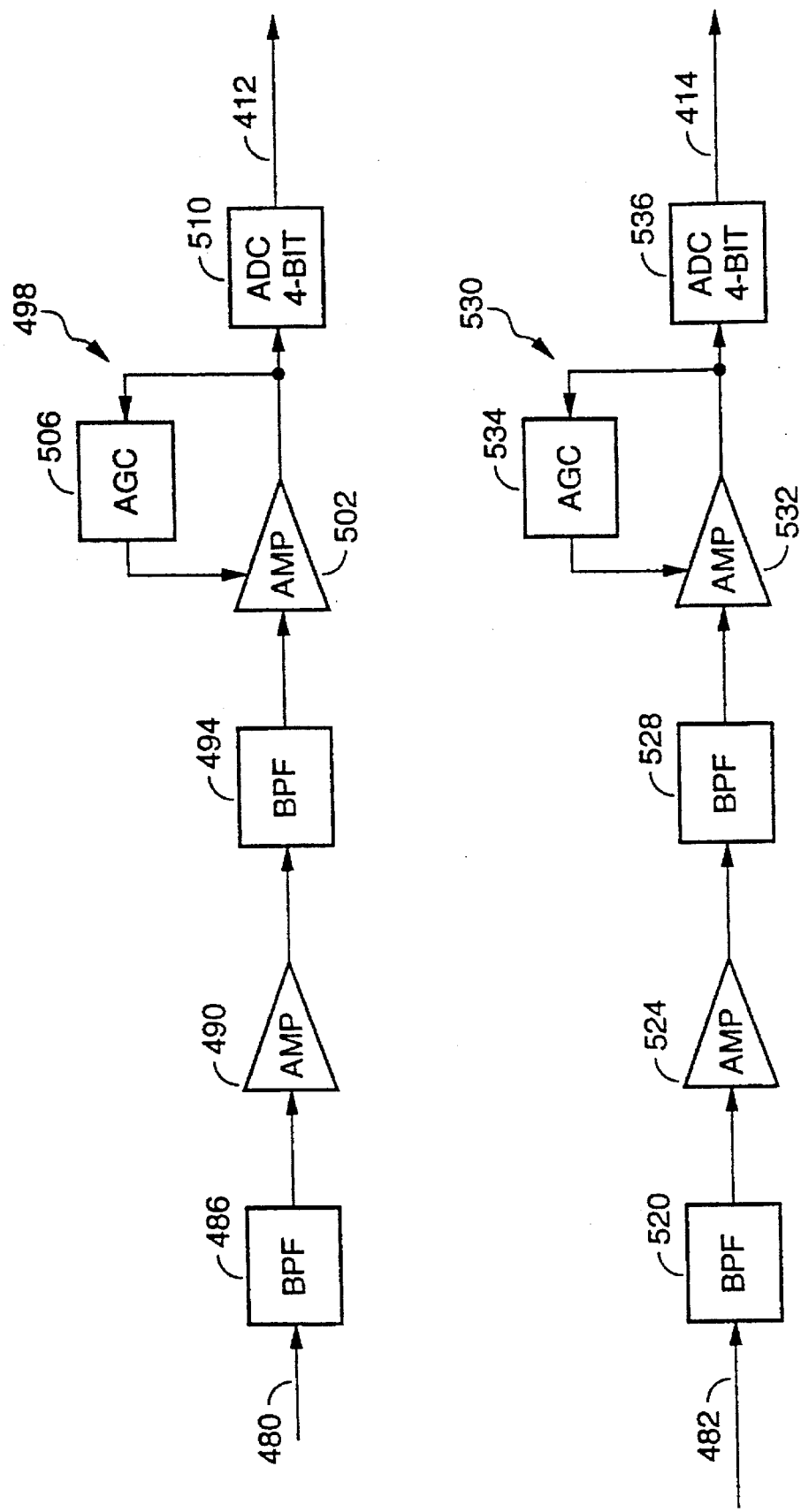
FIG. 12 provides a block diagrammatic representation of an I.F. processing network disposed to be incorporated within a GPS receiver.

FIG. 12 provides a block diagrammatic representation of the I.F. processing network 17. The L1 I.F. signal on line 480 is seen to be passed through an L1 channel I.F. bandpass filter 486 having a bandwidth of 50 MHz, and a center frequency of 7 f0, in order to remove undesired sideband frequencies generated within the mixer 452 (FIG. 11). The filtered L1 channel signal is amplified by a first L1 channel I.F. amplifier 490; passed through a SAW L1 channel bandpass filter 494; and then provided to an automatic gain controlled (AGC) amplifier network 498. In the embodiment of FIG. 12 the network 498 includes a second L1 channel I.F. amplifier 502 configured in a feedback arrangement with an AGC circuit 506. The signal produced by the AGC network 498 is digitized within a 4-bit analog to digital converter 510, which sends the resulting L1 I.F. serial stream of binary data to the baseband processor 21 over the signal line 412.

Similarly, the L2 I.F. signal on line 482 is seen to be passed through an L2 channel I.F. bandpass filter 520 having a bandwidth of 50 MHz, and a center frequency of 7 f0, in order to remove undesired sideband frequencies generated within the mixer 456 (FIG. 11). The filtered L2 channel signal is amplified by a first L2 channel I.F. amplifier 524; passed through a SAW L2 channel bandpass filter 528; and then provided to an automatic gain controlled (AGC) amplifier network 530. In the embodiment of FIG. 12 the network 530 includes a second L2 channel I.F. amplifier 532 configured in a feedback arrangement with an AGC circuit 534. The signal produced by the AGC network 530 is digitized within a 4-bit analog to digital converter 536, which sends the resulting L2 I.F. serial stream of binary data to the baseband processor 21 over the signal line 414.

VI. L1 C/A Channel Processing

Figure 13:
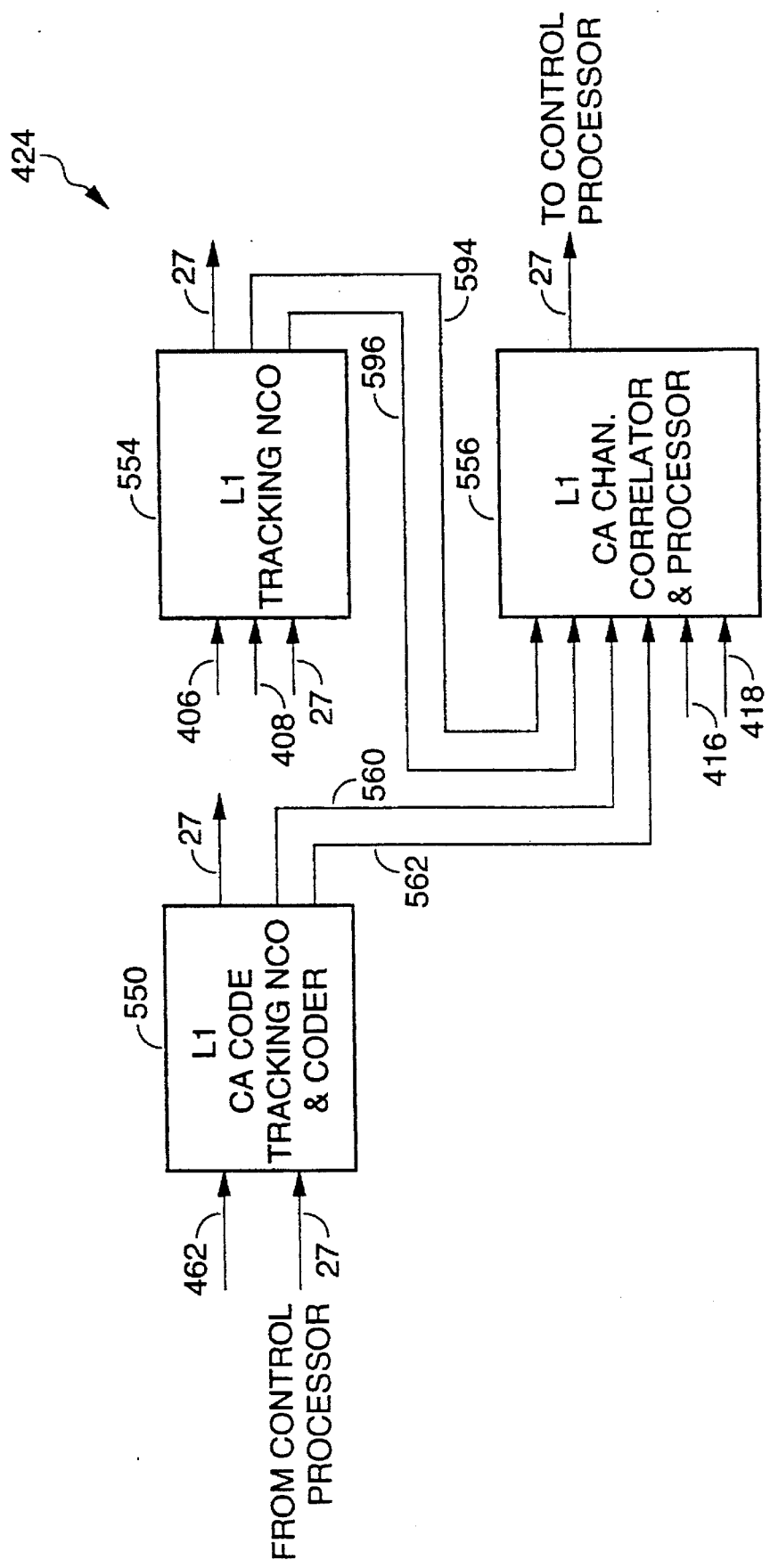
FIG. 13 is a block diagram of an L1 C/A channel processor included within an exemplary baseband processor.

Turning now to FIG. 13, a block diagram is provided of the L1 C/A channel processor 424. The signal processing performed within the processor 424 is coordinated by the digital control processor 25 via instructions provided over the bus 27. The control processor 25 is designed to perform code and carrier tracking functions so as to enable synchronization of the locally generated code (i.e., C/A code and P-code) and carrier signals with those of the L1 signal received by the antenna 11 (FIG. 1). Referring to FIG. 13, each L1-C/A channel processor 424 includes an L1 code-tracking numerically-controlled oscillator (NCO) & C/A coder network 550, an L1 carrier tracking NCO network 554 and an L1 C/A correlator & processor network 556. Operation of the L1 C/A channel processor 424 is described below with reference to FIGS. 14A, 14B and 15, which respectively depict block diagrams of the L1 C/A NCO and coder network 550, the L1 carrier tracking NCO network 554, and the L1 C/A correlator & processor network 556.

Figure 14A:
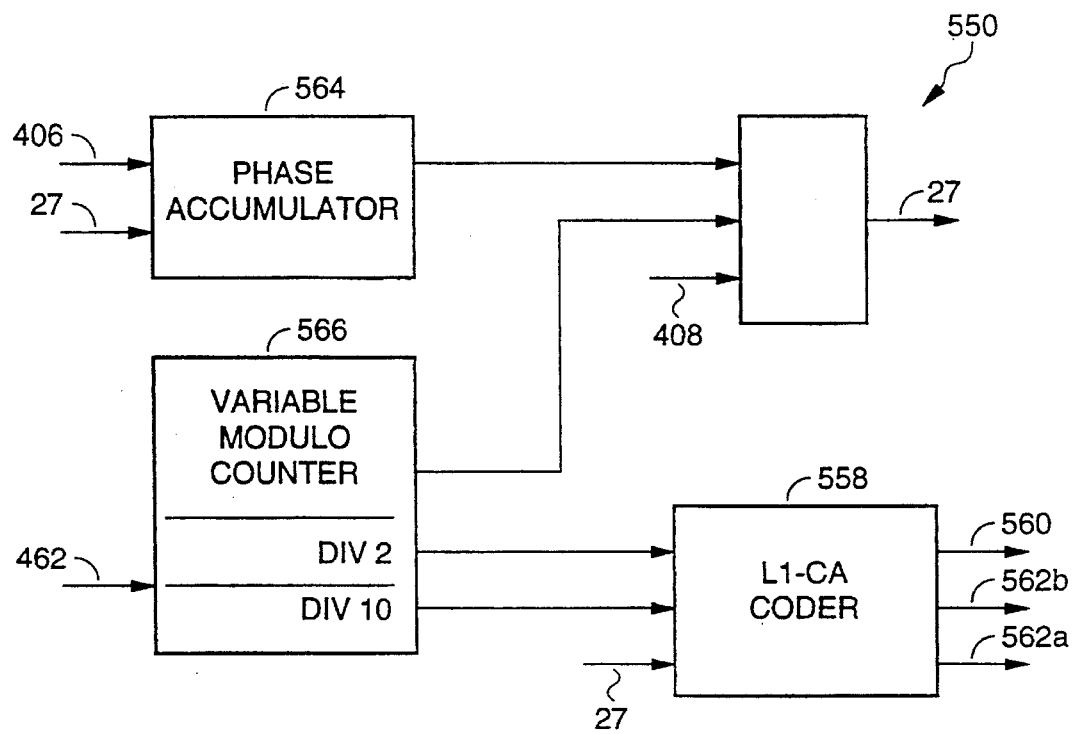
FIGS. 14A and 14B respectively depict block diagrams of an L1 C/A numerically-controlled oscillator (NCO) and coder network, and an L1 carrier tracking NCO network.

In response to control data from digital processor 25, a C/A coder 558 (FIG. 14A) within network 550 is set up to generate a C/A code sequence on line 560 associated with one of the GPS satellites providing an L1 signal being tracked. The code sequence impressed on line 560 is a "punctual" C/A code intended to be synchrony with the received C/A code. Within the coder 558 the punctual C/A code is disposed to be advanced by a fraction of a C/A cycle to produce an early C/A code, and to be retarded by fraction of C/A code cycle to produce a late C/A code. The early and late C/A codes are provided on lines 562a–b, with a C/A early-late difference signal corresponding to subtraction of the late C/A code from the early C/A code being comprised of states 0, +1, −1. As is indicated by FIG. 14A, the digital processor 25 also sends control data via bus 27 to a phase accumulator 564 operative to generate periodic pulses applied to a variable modulo counter 566 so as to maintain synchronization between the punctual C/A code sequence and the C/A code modulation carried by the received L1 signal.

Figure 15:
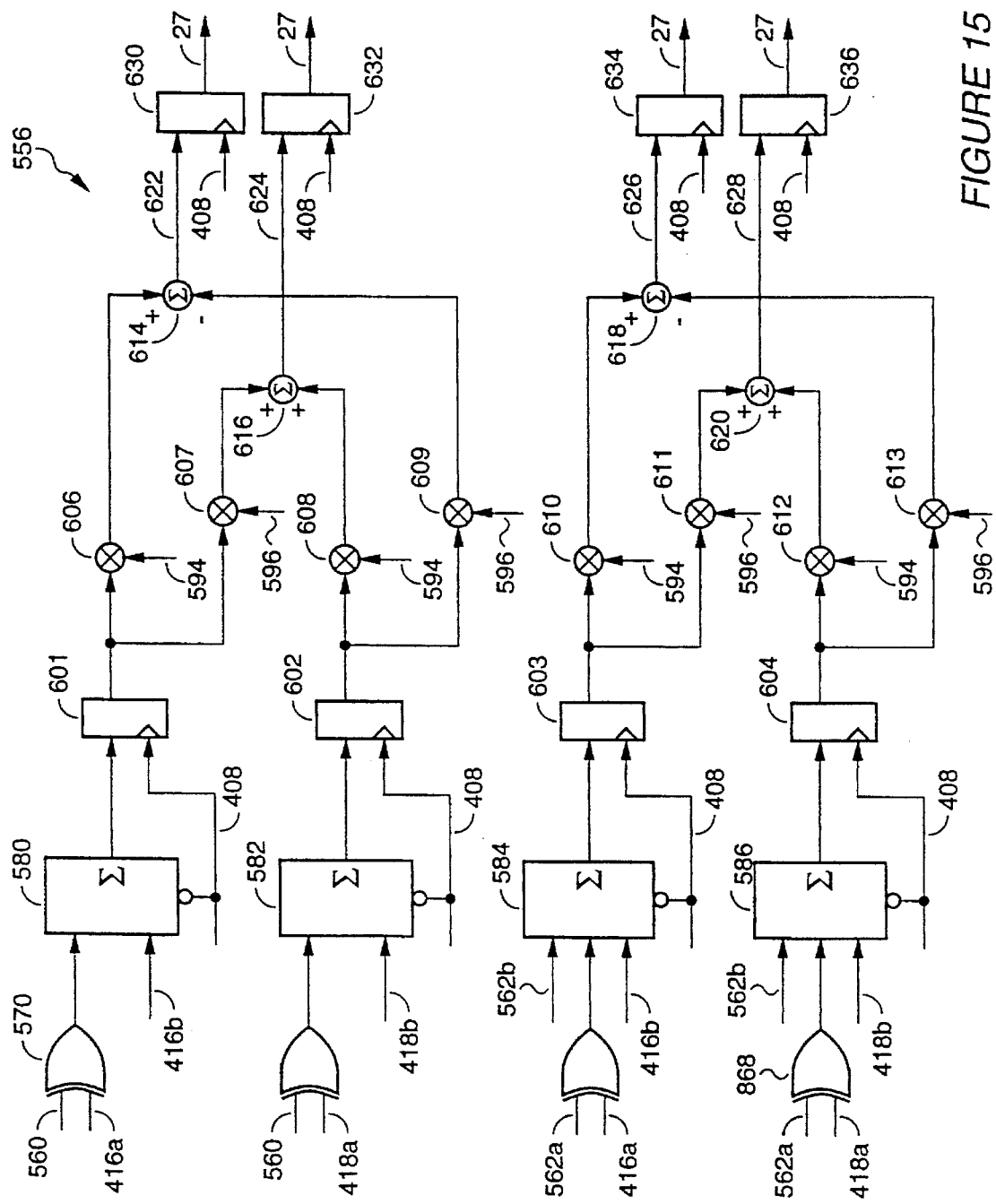
FIG. 15 is a block diagram of an L1 C/A correlator & processor network.

Referring now to FIG. 15, the quadrature components of the incoming L1 signals on lines 416 and 418 are correlated with the C/A punctual and difference code sequences on lines 560 and 562a–b by exclusive-or circuits 570, 572, 574 and 576. In the implementation of FIG. 15 the SIGN bits of the quadrature L1 signals are carried by signal lines 416a and 418a, while the magnitude information of the quadrature L1 signals are conveyed over lines 416b and 418a. The outputs of the exclusive-or circuits 570, 572, 574 and 576, which are free of C/A code if the locally generated punctual C/A code sequence is perfectly aligned with the C/A code modulation carded by the received L1 signals, are then each integrated over a one millisecond period within integrators 580, 582, 584 and 586.

Figure 14B:
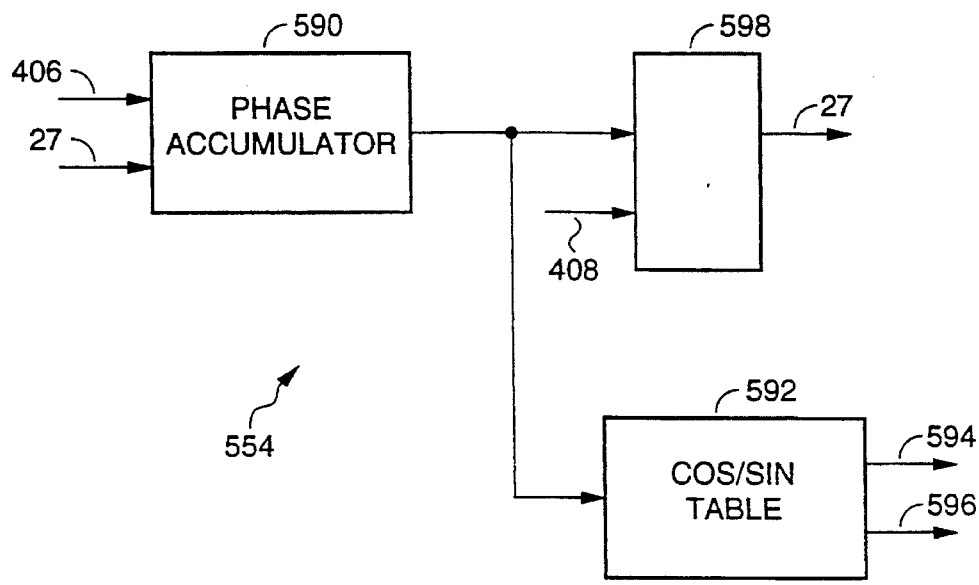

As is indicated by FIG. 14B, the digital processor 25 sends control data on bus 27 to a phase accumulator 590 operative to replicate the phase of the L1 carrier signal. A sine/cosine look-up table 592 provides quadrature components of the locally-generated L1 carrier on lines 594 and 596 in response to phase information from the phase accumulator 590. The L1 phase information from the phase accumulator 590 is also provided to an L1 carrier register 598 disposed to impress the L1 phase information onto bus 27. The L1 phase information is clocked out of register 598 once each millisecond in accordance with the reference signal on line 408, and is routed through control processor 25 to navigation processor 29 for further processing.

Referring to FIGS. 14B and 15, the quadrature components of the locally-generated L1 carrier on lines 594 and 596 are used to remove the L1 carrier signal from the decorrelated outputs of the integrators 580, 582, 584 and 586. In particular, the outputs of the integrators 580, 582, 584 and 586 are latched at one millisecond intervals using latches 601–604, respectively. A first pair of digital multipliers 606 and 607 is connected to latch 601; a second pair of digital multipliers 608 and 609 is connected to latch 602; a third pair of digital multipliers 610 and 611 is connected to latch 603; and a fourth pair of digital multipliers 612 and 613 is connected to latch 604. Each pair of multipliers are provided with the locally-generated quadrature L1 carrier signals via lines 594 and 596, thereby resulting in removal of the L1 carrier when the locally-generated carrier is in phase with the received L1 carrier. The outputs of the digital multipliers are then combined within digital adders 614, 616, 618 and 620 to produce the L1 C/A channel outputs R1CS, R1CC, D1CS, D1CC on C/A channel output lines 622, 624, 626 and 628.

A set of four L1 CA-channel output latches 630, 632, 634 and 636 provide the outputs R1CS, R1CC, D1CS, D1CC once each millisecond to the digital processor 25 via the bus 27. The digital processor 25 operates to minimize the R1 CS and D1CS signals, and to maximize the R1CC signal, by adjusting the timing of the phase accumulators 564 and 590 utilized in generation of the C/A code and cartier signals. This causes the locally-generated C/A code and carrier to become aligned with the C/A code and carrier of the L1 signal received from a particular GPS satellite. Upon such alignment of the locally-generated and received L1 signals the precise phase L1 carrier signal is known, thereby allowing the L1 carrier signal to be used in the signal processing operations described below.

VII. L1 P-Channel Processing

Referring again to FIG. 10, the phase of the L1 carrier signal recovered by the L1 C/A-channel processor 424 is provided to the L1 P-channel processor 426 by the processor 25 via the bus 27. The recovered L1 carrier phase information is utilized by the L1 P-channel processor 426 in the tracking of the L1 P-code and in the ensuing generation of a code-tracking signal used in demodulation of the L2 carrier.

Figure 16:
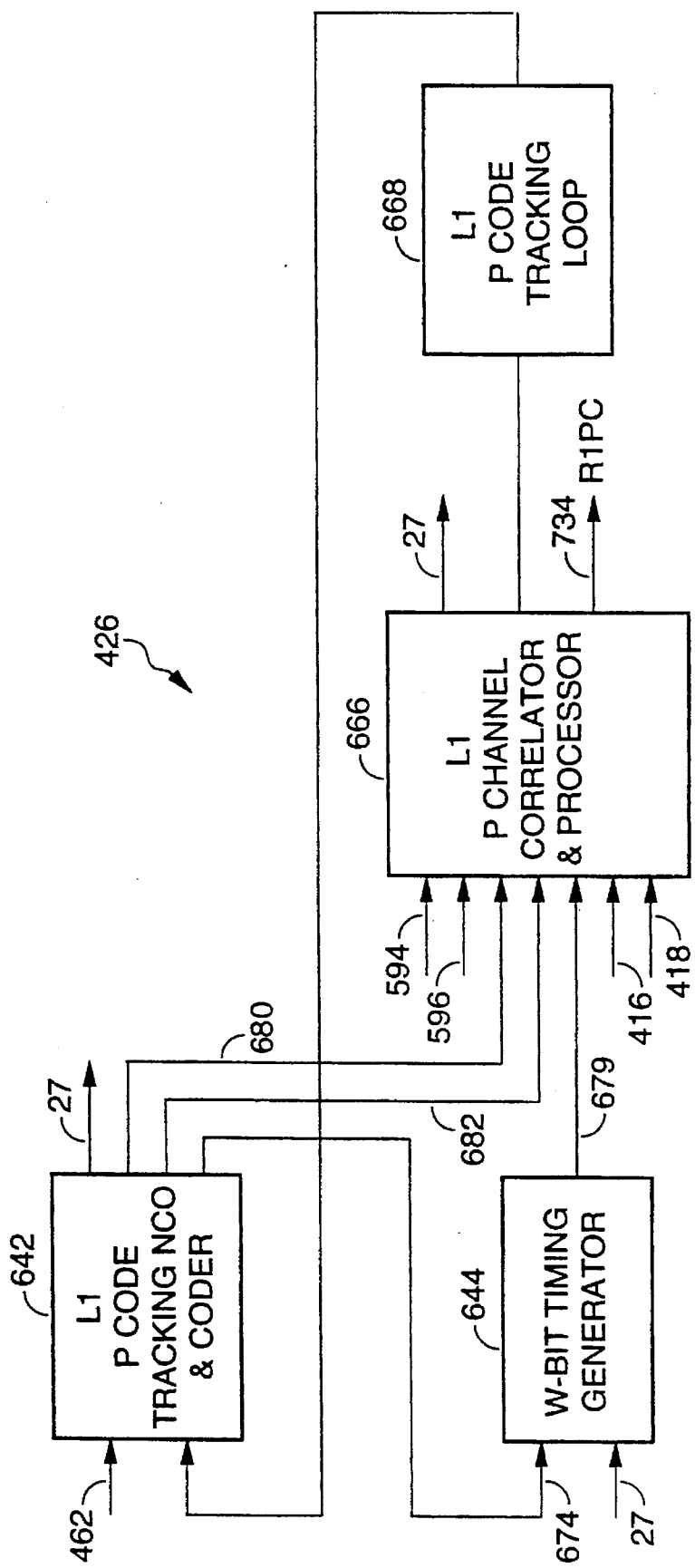
FIG. 16 is a block diagram of a preferred implementation of an L1 P-channel processor.

Turning now to FIG. 16, there is shown a block diagram of a preferred implementation of the L1 P-channel processor 426. The L1 P-channel processor includes an L1 P-code track numerically controlled oscillator (NCO) and P-coder network 642, an L1 W-bit timing generator 644, an L1 P-channel correlator and processor network 666, and an L1 P-code tracking loop 668. As discussed in the Background of the Invention, the L1 P-code is sometimes modulated by the United States Government using the classified W-code. The resulting encrypted code, generally referred to as the "Y-code", is known to consist of the modulo two sum of the known L1 P-code and the unknown W-code. It is also known that the W-code is generated in synchrony with the P-code such that the edges of each bit of the W-code are aligned with the edges of an associated P-code chip. The W-code bit period has been determined to average approximately 20 L1 P-code cycles (i.e., chips) in duration, but is not uniform over each W-code bit. Rather, it has been deduced the W-code comprises a number of periodically repeated W-code bit patterns. Each repetition includes a number N1 of W-code bits having a duration of "A" L1 P-code chips, followed by a number N2 of W-code bits having a duration of "B" L1 P-code chips. From measurements performed using high-gain antennas it has been possible to empirically determine the parameters A, B, N1, N2 using conventional techniques.

It has been further ascertained that the W-code sequence is synchronized with "X1A1 epoch" periods inherent within the L1 P-code, where each X1A1 epoch has a period of 4,092 P-code chips. Each W-code repetition of N1 W-code bits of length "A" P-code chips and N2 W-code bits of length "B" P-code chips is timed to coincide with one of the X1A1 epochs. The L1 W-bit timing generator 644 is designed to provide a first clock pulse following the N1 W-bits of length "A" L1 P-code chips at the beginning of each X1A1 epoch, and a second clock pulse following the N1 W-bits of length "A" L1 P-code chips at the end of each X1A1 epoch.

Figure 17A:
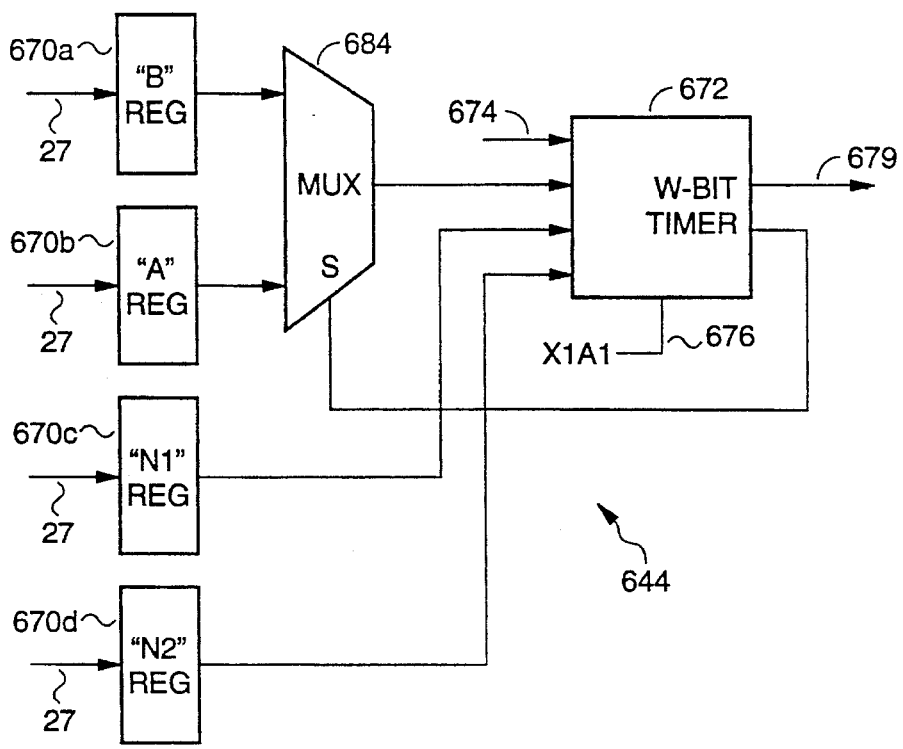
FIG. 17A depicts a block diagram of an L1 channel W-bit timing generator.

Turning now to FIG. 17A, there is depicted a block diagram of the L1 channel W-bit timing generator 644. The timing generator 644 receives the parameters A, B, N1 and N2 at L1 W-bit input registers 670a–d from the digital processor 25 via bus 27. An L1 P-code clock signal from a variable modulo counter 686 (FIG. 18A) is received by an L1 W-bit timer circuit 672 on line 674. After being reset via line 676 by the L1 P-coder 678 (FIG. 18A) at the beginning of each X1A1 epoch, the W-bit timer circuit 672 impresses the first and second timing pulses described above upon line 679 during each X1A1 epoch.

Figure 18A:
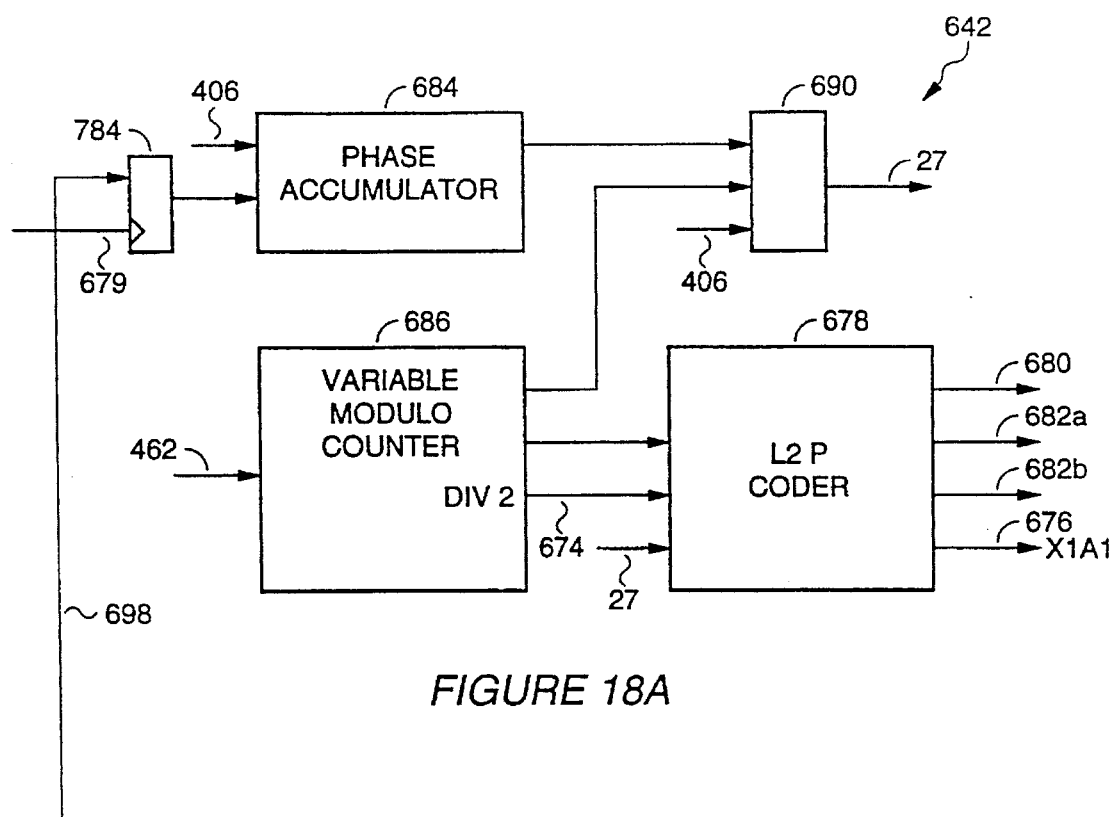
FIGS. 18A and 18B show block diagram representations of preferred implementations of an L1 NCO and P-coder network, and of an L1 P-code tracking loop.
Figure 18B:
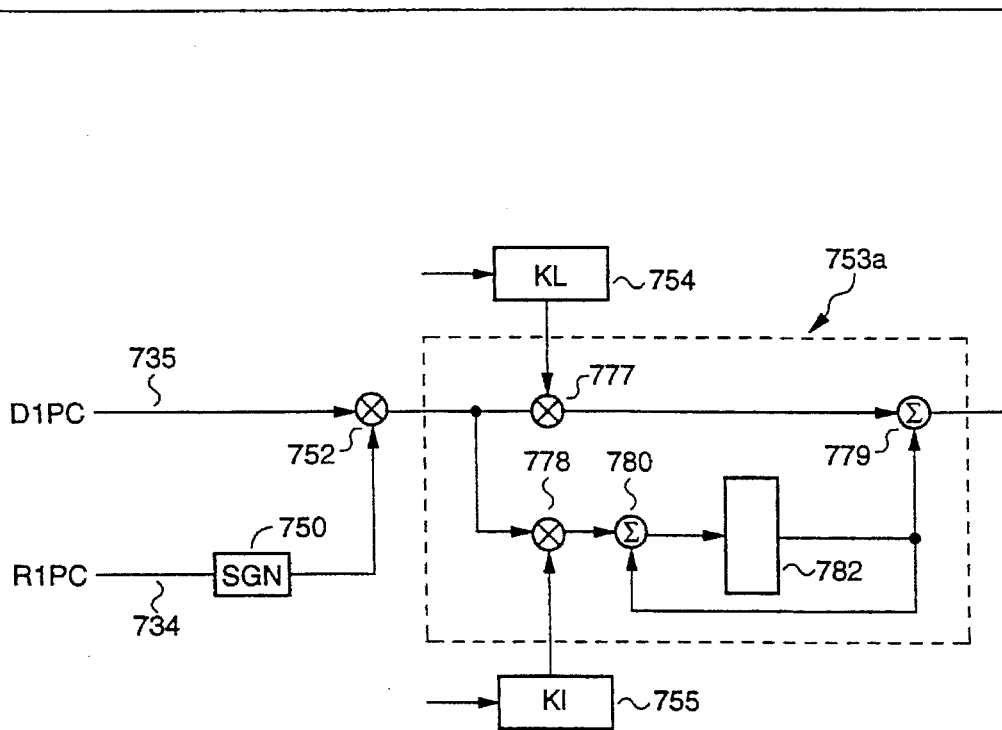

Referring now to FIGS. 18A and 18B, there are shown block diagram representations of preferred implementations of the NCO and P-coder network 642, and of the L1 P-code tracking loop 668, respectively. The P-coder 678 within the P-coder network 642 operates to impress a punctual P-code signal unique to a particular GPS satellite upon line 680. The code sequence impressed on line 680 is "punctual" code in that it is intended to be synchronized with the received L1 P-code. Within the coder 678 the punctual P-code is disposed to be advanced by a fraction of a P-code cycle to produce an early P-code, and to be retarded by fraction of a P-code cycle to produce a late P-code. The early and late P-codes are provided on lines 682a–b, with a P-code early-late difference signal corresponding to subtraction of the late P-code from the early P-code being comprised of states 0, +1, −1. As is indicated by FIG. 18A, a feedback signal impressed on feedback line 688 by the L1 P-code tracking loop 668 (FIG. 18B) is supplied to the phase accumulator 684 in order to control the timing of the periodic pulse sequence used in the counter 686 to produce P-code data on line 674. The output of the counter 686 is also used in conjunction with the output of the phase accumulator 684 to provide phase information relating to the phase of the locally-generated P-code. This P-code phase information is latched in a sixteen bit register 690 in which the ten least significant bits are provided by the accumulator 684, and the remaining six most significant bits are received from the counter 686. The resulting P-code phase information is clocked from register 690 onto bus 27 once every millisecond.

Figure 19:
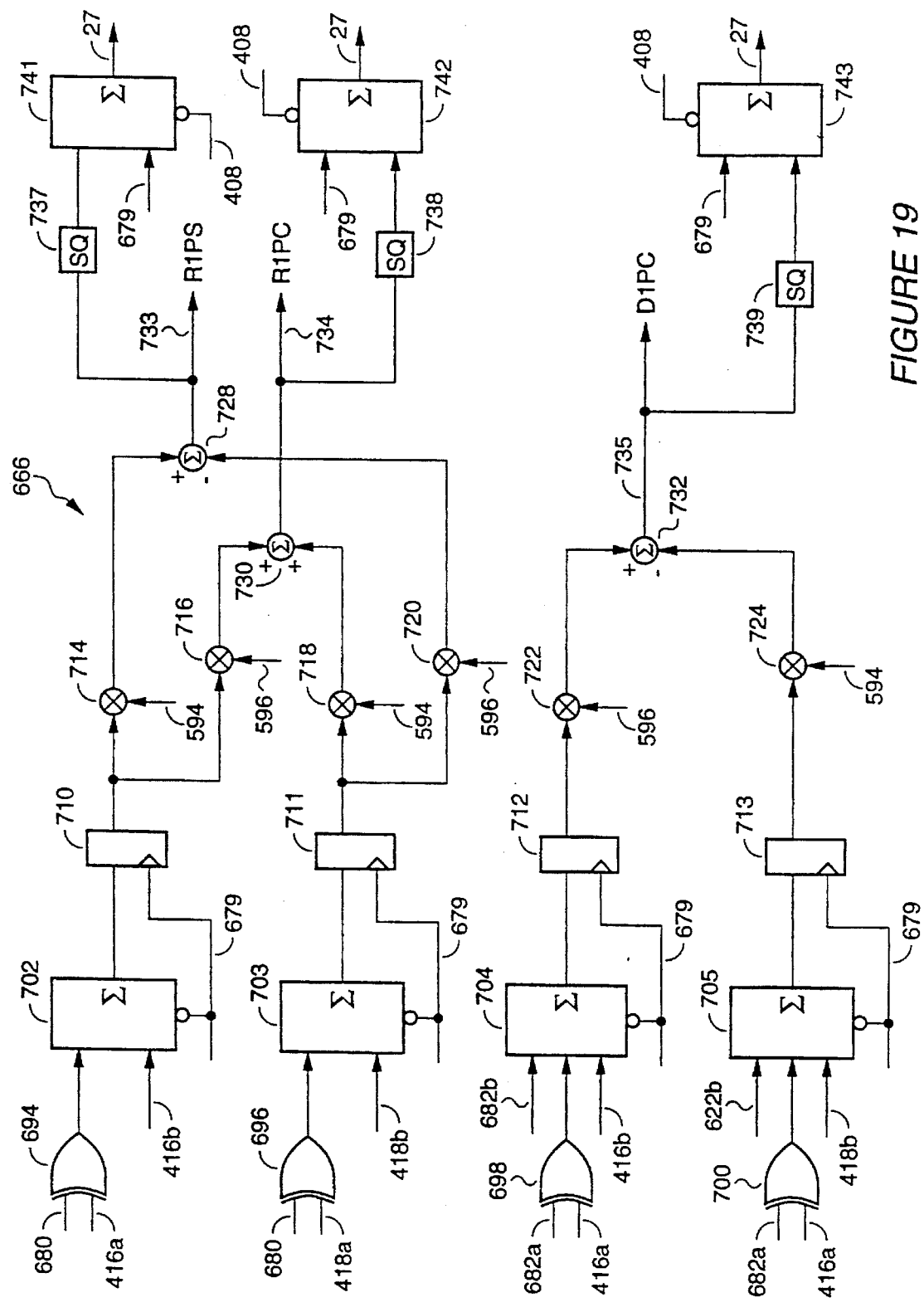
FIG. 19 shows a block diagram of a preferred implementation the L1 P-channel correlator and processor network.

Turning now to FIG. 19, there is depicted a block diagram of a preferred implementation the L1 P-channel correlator and processor network 666. As is indicated by FIG. 19, the quadrature components of the incoming L1 signals on lines 416 and 418 axe correlated with the P-code punctual and difference sequences on lines 680 and 682a–b by P-channel exclusive-or circuits 694, 696, 698 and 700. In the implementation of FIG. 19 the SIGN bits of the quadrature L1 signals are carried by signal lines 416a and 418b, while the magnitude information of the quadrature L1 signals are conveyed over lines 416b and 418b. The outputs of the exclusive-or circuits 694, 696, 698 and 700, which are free of P-code if the locally generated punctual P-code sequence is perfectly aligned with the P-code modulation carried by the received L1 signals, are then each integrated over a single W-code bit period within integrators 702–705.

Referring to FIG. 19, the quadrature components of the locally-generated L1 carrier on lines 594 and 596 axe used to remove the L1 carrier signal from the decorrelated outputs of the integrators 702–705. In particular, the outputs of the integrators 702–705 axe latched at intervals corresponding to a single bit of the W-code using latches 710–713, respectively. A first pair of P-channel digital multipliers 714 and 716 is connected to latch 710, and a second pair of P-channel digital multipliers 718 and 720 is connected to latch 711. In addition, multipliers 722 and 724 are connected to latches 712 and 713, respectively. The first and second pairs of P-channel multipliers are each seen to be provided with the locally-generated quadrature L1 carrier signals via lines 594 and 596. Similarly, the quadrature L1 carrier signals on lines 594 and 596 are respectively provided to the multipliers 722 and 724. In this way the carrier component is removed from the outputs of multipliers 714, 716, 718, 720, 722 and 724 when the locally-generated L1 carrier is in phase with the received L1 carrier. The outputs of the digital multipliers 714 and 720 are then combined within digital adder 728. In like manner the outputs of the digital multipliers 716 and 718 are combined within digital adder 730, and the outputs of the digital multipliers 722 and 724 are combined within digital adder 732. The digital adders produce the L1 P-channel outputs RIPS, R1PC, and D1PC on L1 P-channel output lines 733–735. The signals impressed on the P-channel output lines 733–735 are respectively squared by squaring circuits 737–739, and respectively integrated over interval of one W-code bit period by integrators 741–743. The outputs of integrators 741–743 may be read by the digital processor 25 by way of the bus 27 in order to monitor the phase relationship between the locally-generated L1 P-code and the received P-code sequences.

As is shown within the representation of the P-code tracking loop of FIG. 18B, the SIGN of the R1PC signal on line 734 is determined by a SIGN circuit 750 coupled to digital multiplier circuit 752. The output of the SIGN circuit 750 and the D1PC signal on line 735 are multiplied at multiplier circuit 752 in order to remove the W-code from the received signal. The multiplied signal provided by the multiplier circuit 752 is applied to a second order control loop 753a, in which the loop constants KI and KL have been loaded into loop constant registers 754 and 755 by the digital processor 25.

The control loop 753a includes digital multiplier circuits 777 and 778 which are respectively connected to the loop constant registers 754 and 755, and which are each coupled to the output of digital multiplier circuit 752. The scaled outputs produced by multiplier circuits 777 and 778 are respectively provided to first input ports of digital adders 779 and 780. The signal generated by the adder 780 is stored within a register 782, the output of which is applied to second inputs of the adders 779 and 780. The feedback signal output by the control loop 753a, which is impressed by digital adder 779 on feedback line 688, is fed back to latch 784. The feedback signal causes the phase accumulator 684 and P-coder 678 to operate such that the locally-generated P-code impressed upon line 680 is locked to the P-code of the received L1 signal. Upon locking of the locally-generated L1 P-code and L1 W-code to the corresponding P-code and W-code carded by the received L1 signal, the R1PC signal on line 734 (FIG. 19) will be at maximum value. The R1PC signal is used to aid in the recovery of the L2 code and carrier signal information in the manner described below.

VIII. L2 P-Channel Processing

In the preferred embodiment the L2 P-channel processor 428 (FIG. 10) is designed to track the phases of the P-code and carrier of the L2 signal received from a particular GPS satellite. As was discussed in the Background of the Invention, knowledge of the L2 P-code and carrier phase facilitates high-precision kinematic measurements.

Figure 20:
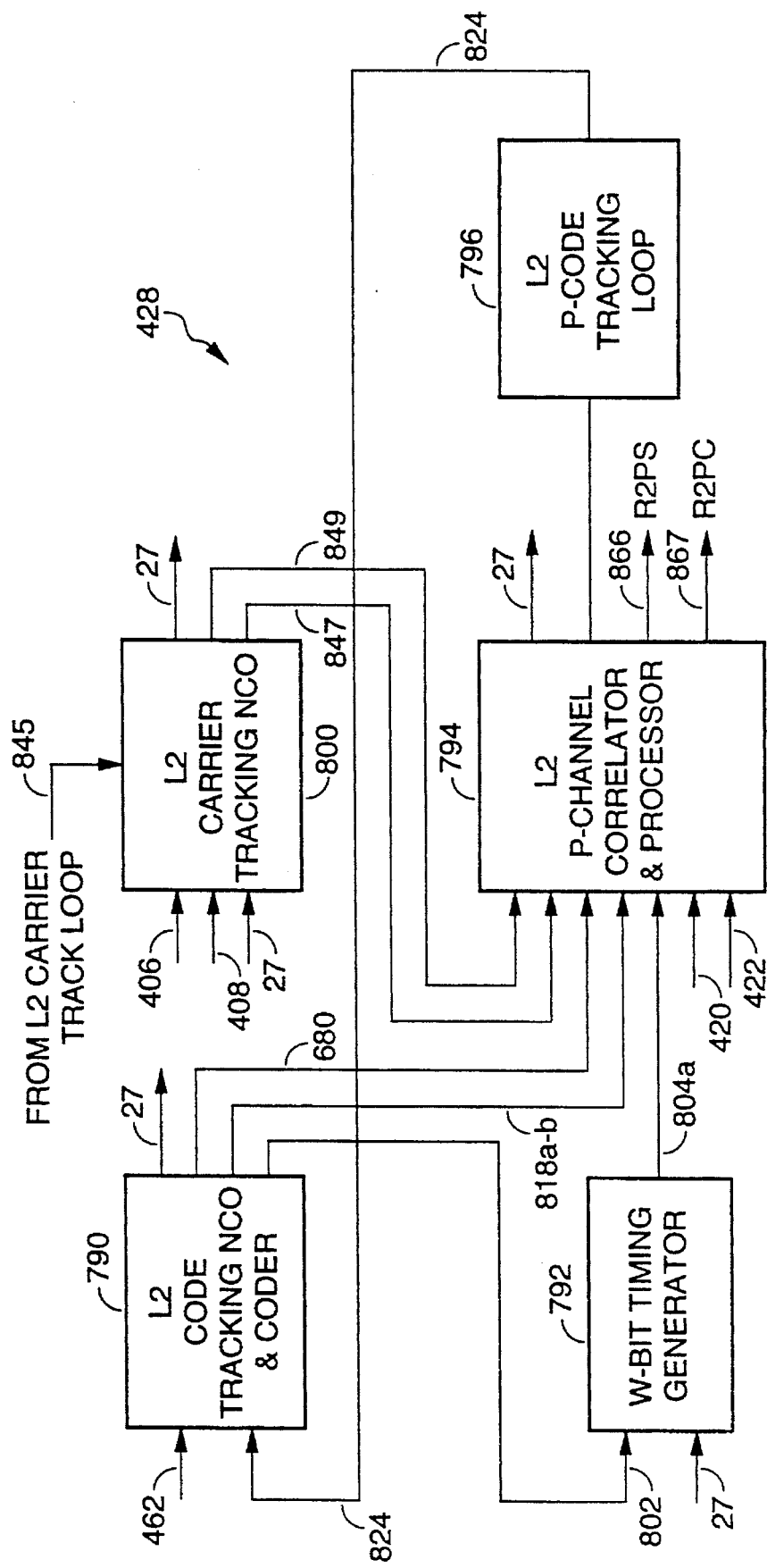
FIG. 20 is a block diagram of a preferred implementation of an L2 P-channel processor.

Turning now to FIG. 20, there is shown a block diagram of the L2 P-channel processor 428. The L2 P-channel processor 428 includes an L2 P-code track numerically controlled oscillator (NCO) and P-coder network 790, an L2 W-bit timing generator 792, an L2 P-channel correlator and processor network 794, and an L2 P-code tracking loop 796. W-code timing information is seen to be provided to the L2 P-channel correlator and processor network 794 by the W-bit timing generator 792. Similarly, L2 carrier phase information is provided to the L2 P-channel correlator and processor network 794 by an L2 carrier tracking NCO network 800.

Similar to the L1 P-code, the L2 P-code is also sometimes modulated using the classified W-code. Again, it is known that the resulting encrypted Y-code consists of the modulo two sum of the known L2 P-code and the unknown W-code. It is also known that the W-code is generated in synchrony with the P-code such that the edges of each bit of the W-code are aligned with the edges of an associated P-code chip. The W-code bit period has been determined to average approximately 20 L2 P-code cycles (i.e., chips) in duration, but is not uniform over each W-code bit. Rather, it has been deduced the W-code comprises a number of periodically repeated W-code bit patterns. Each repetition includes a number N1 of W-code bits having a duration of "A" L2

P-code chips, followed by a number N2 of W-code bits having a duration of "B" L1 P-code chips. From measurements performed using high-gain antennas it has been possible to empirically determine the parameters A, B, N1, N2 using conventional techniques.

It has been further ascertained that the W-code sequence is synchronized with "X1A2 epoch" periods inherent within the L2 P-code, where each X1A2 epoch has a period of 4,092 P-code chips. Each repetition of N1 W-code bits of length "A" P-code chips and N2 W-code bits of length "B" P-code chips is timed to coincide with one of the X1A2 epochs. The L2 W-bit timing generator 792 is designed to provide a first clock pulse following the N1 W-bits of length "A" L1 P-code chips at the beginning of each X1A1 epoch, and a second clock pulse following the N1 W-bits of length "A" L2 P-code chips at the end of each X1A1 epoch.

Figure 17B:
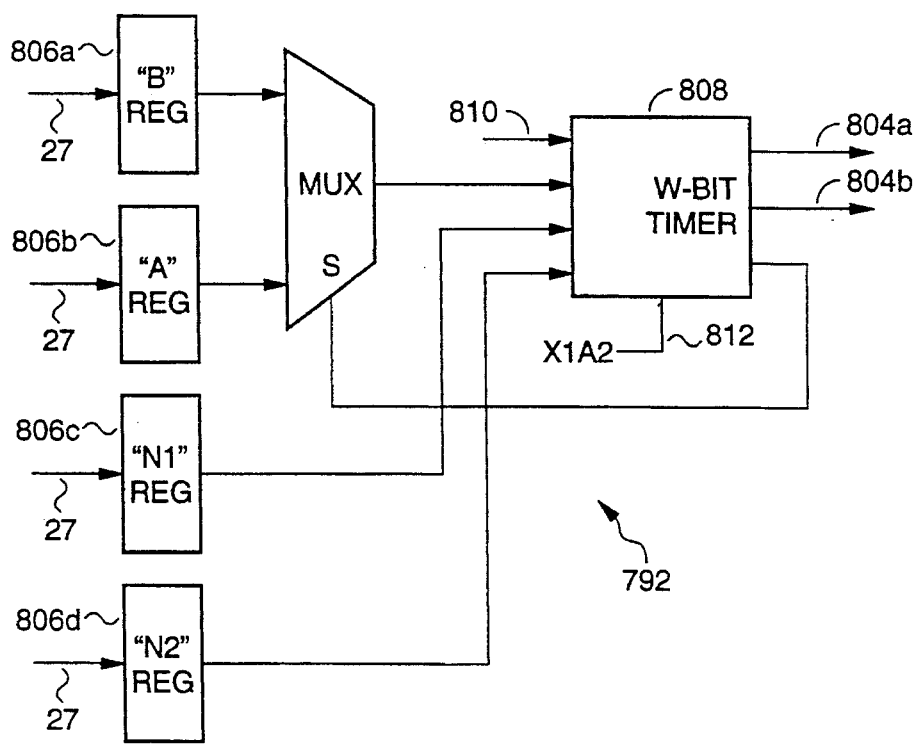
FIG. 17B depicts a block diagram of an L2 channel W-bit timing generator.

Turning now to FIG. 17B, there is depicted a block diagram of the L2 channel W-bit timing generator 792. The timing generator 792 receives the parameters A, B, N1 and N2 at L2 W-bit input registers 806a–d from the digital processor 25 via bus 27. An L2 P-code clock signal from a variable modulo counter 822 (FIG. 21A) is received by an L2 W-bit timer circuit 808 on line 810. After being reset via line 812 by the L2 P-coder 814 (FIG. 21A) at the beginning of each X1A2 epoch, the W-bit timer circuit 808 impresses the first and second timing pulses described above upon line 804a during each X1A2 epoch. The complement of the timing signal carried by line 804a is provided by timing circuit 808 upon line 804b. The timing information impressed by the timing generator 792 upon lines 804a–b is used in the manner described hereinafter to aid in demodulation of the L2 P-code signal.

Figure 21A:
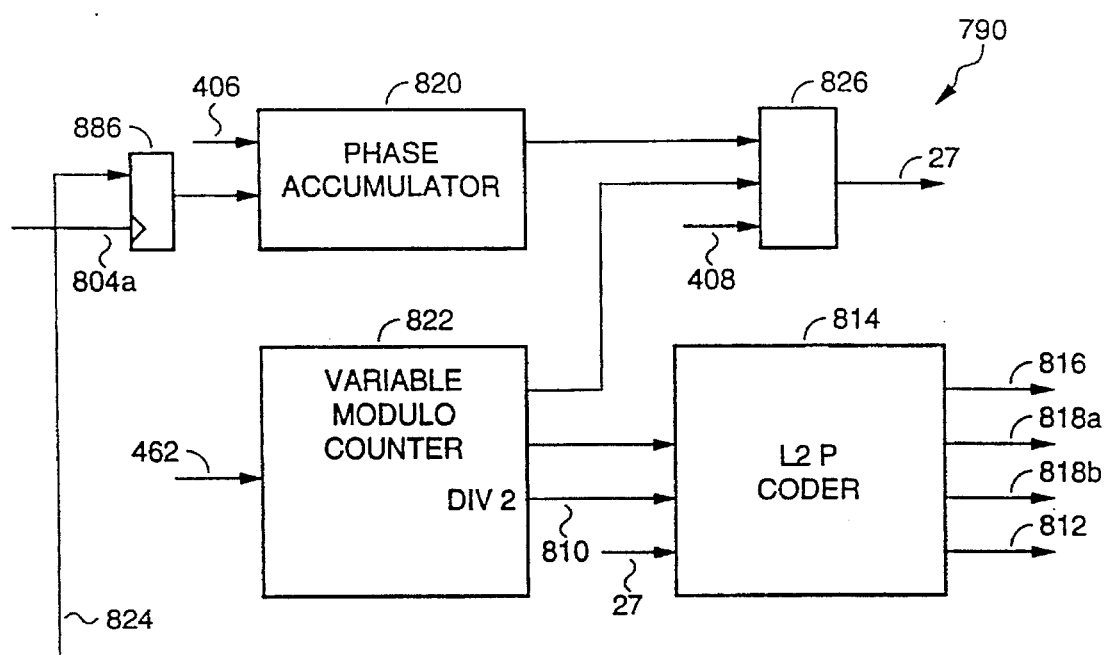
FIGS. 21A and 21B show block diagram representations of preferred implementations of an L2 NCO and P-coder network, and of an L2 P-code tracking loop, respectively.
Figure 21B:
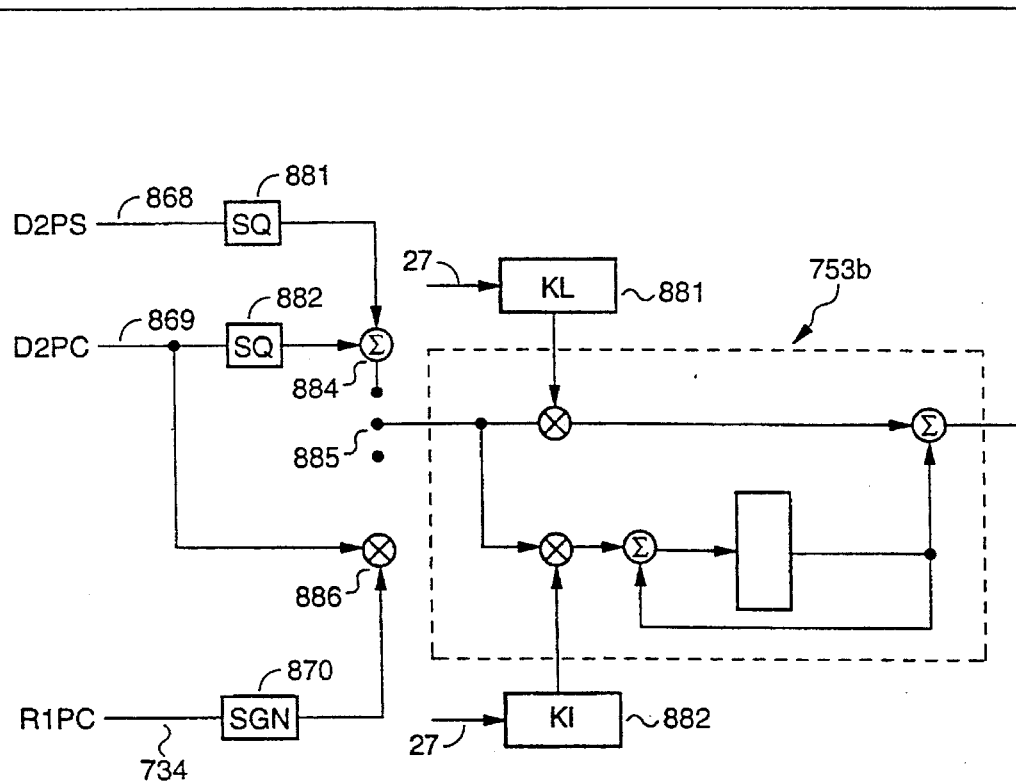

Referring now to FIGS. 21A and 21B, there are shown block diagram representations of preferred implementations of the L2 NCO and P-coder network 790, and of the L2 P-code tracking loop 796, respectively. The L2 P-coder 814 within the P-coder network 790 operates to impress a punctual P-code signal unique to a particular GPS satellite upon line 816. Again, the code sequence impressed on line 816 is a "punctual" code in that it is intended to be synchronized with the received L2 P-code. Within the L2 P-coder 814 the punctual P-code is disposed to be advanced by a fraction of a P-code cycle to produce an early L2 P-code, and to be retarded by fraction of an L2 P-code cycle to produce a late L2 P-code. The early and late L2 P-codes are provided on lines 818a–b, with an L2 P-code early-late difference signal corresponding to subtraction of the late L2 P-code from the early L2 P-code being comprised of states 0, +1, −1. As is indicated by FIG. 21A, a phase accumulator 820 operates to provide periodic pulses to a variable modulo counter 822 so as to maintain synchronization between the punctual P-code sequence and the P-code modulation carried by the received L2 signal.

A feedback signal impressed on feedback line 824 by the L2 P-code tracking loop 796 (FIG. 21B) is supplied to the phase accumulator 820 in order to control the timing of the periodic pulse sequence provided to counter 822. The outputs of the counter 822, in conjunction with the outputs of the phase accumulator 820, provide information relating to the phase of the locally-generated P-code. This P-code phase information is latched into a sixteen bit register 826 in which the 10 least significant bits are received from the accumulator 820 and the six most significant bits are received from the output of the counter 822. The resultant P-code phase information is then clocked out of register 826 onto bus 27 once every millisecond.

Figure 22:
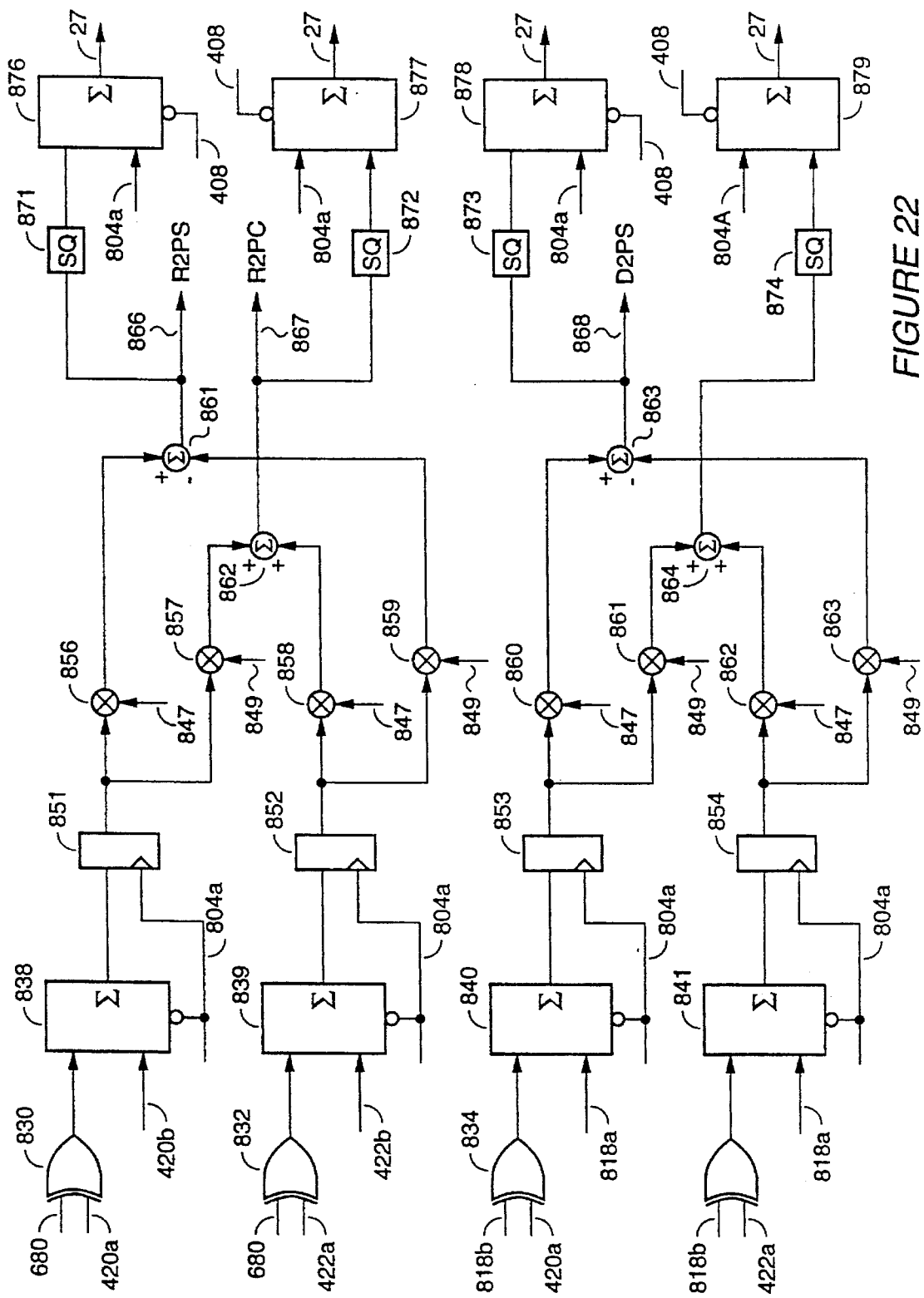
FIG. 22 is a block diagram of a preferred implementation of an L2 P-channel correlator and processor network.

Turning now to FIG. 22, there is depicted a block diagram of a preferred implementation of the L2 P-channel correlator and processor network 794. As is indicated by FIG. 22, the quadrature components of the incoming L2 signals on lines 420 and 422 are correlated with the P-code punctual and difference sequences on lines 680 and 818a–b by P-channel exclusive-or circuits 830, 832, 834 and 836. In the implementation of FIG. 22 the SIGN bits of the quadrature L2 signals are carried by signal lines 420a and 422a, while the magnitude information of the quadrature L2 signals are conveyed over lines 420b and 422b. The outputs of the exclusive-or circuits 830, 832, 834 and 836, which are free of L2 P-code if the locally-generated punctual L2 P-code sequence is perfectly aligned with the P-code modulation carried by the received L2 signal, are then each integrated over a period of one L2 W-code bit within integrators 838–841.

Turning now to FIG. 21 C, there is shown a block diagram of the L2 carrier tracking NCO 800 operative to generate a local replica of the received L2 carrier. The L2 carrier tracking NCO includes a phase accumulator 843 disposed to receive a control signal on a line 845 from an L2 carrier tracking loop described below with reference to FIGS. 23A and 23B. The phase accumulator 843 outputs an accumulated phase signal, in accordance with timing information received over line 406, to a cosine/sine look-up table 846 and to a carrier track output register 847. The cosine and sine of the accumulated phase signal are determined by look-up table 846, with the resulting quadrature components of the locally-generated L2 carrier signal being impressed upon lines 847 and 849. The output register 847 clocks out the accumulated phase signal onto data bus 27 once every millisecond so as to be read by processor 25.

Referring again to FIG. 22, the quadrature components of the locally-generated L2 carrier on lines 847 and 849 are used to remove the L2 carrier signal from the decorrelated outputs of the integrators 838–841. In particular, the outputs of the integrators 838–841 are latched at intervals corresponding to a single L2 W-code bit period using latches 843–846, respectively. A first pair of L2 P-channel digital multipliers 856 and 857 is connected to latch 851; a second pair of L2 P-channel digital multipliers 858 and 859 is connected to latch 852; a third pair of L2 P-channel digital multipliers 860 and 861 is connected to latch 853; and a fourth pair of L2 P-channel digital multipliers 862 and 863 is connected to latch 854. Each of the pairs of L2 P-channel multipliers are provided with the locally-generated quadrature L2 carrier signals via lines 847 and 849. In this way the carrier component is removed from the outputs of each of the multipliers 856–863 when the locally-generated L2 carrier is in phase with the received L2 carrier. The outputs of the digital multipliers 856–863 are combined within digital adders 861–864, in the manner indicated by FIG. 22, so as to produce L2 P-channel outputs R2PS, R2PC, D2PS and D2PC upon L2 P-channel correlator output lines 866–869. The signals impressed on the correlator output lines 866–869 are respectively squared by squaring circuits 871–874, and respectively integrated over one millisecond periods by integrators 876–879. The outputs of integrators 876–879 are read by the digital processor 25 via data bus 27 to facilitate monitoring of the phase relationship between the locally-generated L2 P-code and the L2 P-code carried by the received L2 signal.

Referring now to the representation of the L2 P-code tracking loop 796 provided by FIG. 21B, the loop control parameters KL and KI are loaded into the registers 881 and 882 by the processor 25. In order to initiate operation in a noncoherent L2 P-code tracking mode the processor 25 establishes a connection between the output of digital adder 884 and control loop input line 885. During operation in this mode the D2PS and D2PC signals on lines 868 and 869 are respectively squared by squaring circuits 883a and 883b, and then combined within the digital adder 884. A second order control loop 753b, substantially identical to the control loop 753a (FIG. 18B), produces the feedback signal applied to feedback line 824 in response to the output signal from adder 884 impressed on control line 885. The feedback signal upon line 824 is supplied to a feedback latch 886, and is clocked into phase accumulator 820 once every L2 W-code bit period. This feedback signal is varied so as to force the punctual L2 P-code provided by the L2 P-coder 814 upon line 816 to become locked with the P-code modulation carded by the received L2 signal.

Once lock has been established with the received L2 P-code, the digital processor 25 commences tracking of the L2 carrier signal in accordance with one of the inventive L2 carrier demodulation techniques introduced above within section II. Each of these L2 carrier demodulation techniques is described in further detail within section IX.

Upon phase-lock being achieved with the received L2 carrier using one of the above-referenced L2 demodulation techniques of the invention, the digital processor 25 initiates a coherent P-code track mode by switching the connection of the control line 885 from the output of adder 884 to the output of digital multiplier 886. In the coherent P-code track mode the D2PC signal on line 869, and the SIGN of R1PC signal provided by SIGN circuit 870, are multiplied by the multiplier 886. Processing by the second order control loop 753b and L2 code tracking NCO 790 then proceeds in the manner described with reference to the noncoherent P-code track mode.

IX. Detailed Description of L2 Carrier Demodulation

L2 P-Code Aided Demodulation Using W-Code Rate Integrator.

Referring again to FIG. 22, the quadrature components of the L2 signal on lines 420a–b and 422a–b are first correlated with the locally generated punctual P-code on line 680. The decorrelated signals are then integrated over one W-code bit period within integrators 838–839, and are then multiplied with quadrature components of the estimated L2 carrier phase on lines 847 and 849 using multipliers 856–859. The outputs of the multipliers 856–859 are combined in adders 861–862 in the indicated manner in order to generate quadrature phase error terms R2PS and R2PC on lines 866 and 867.

Figure 21C:
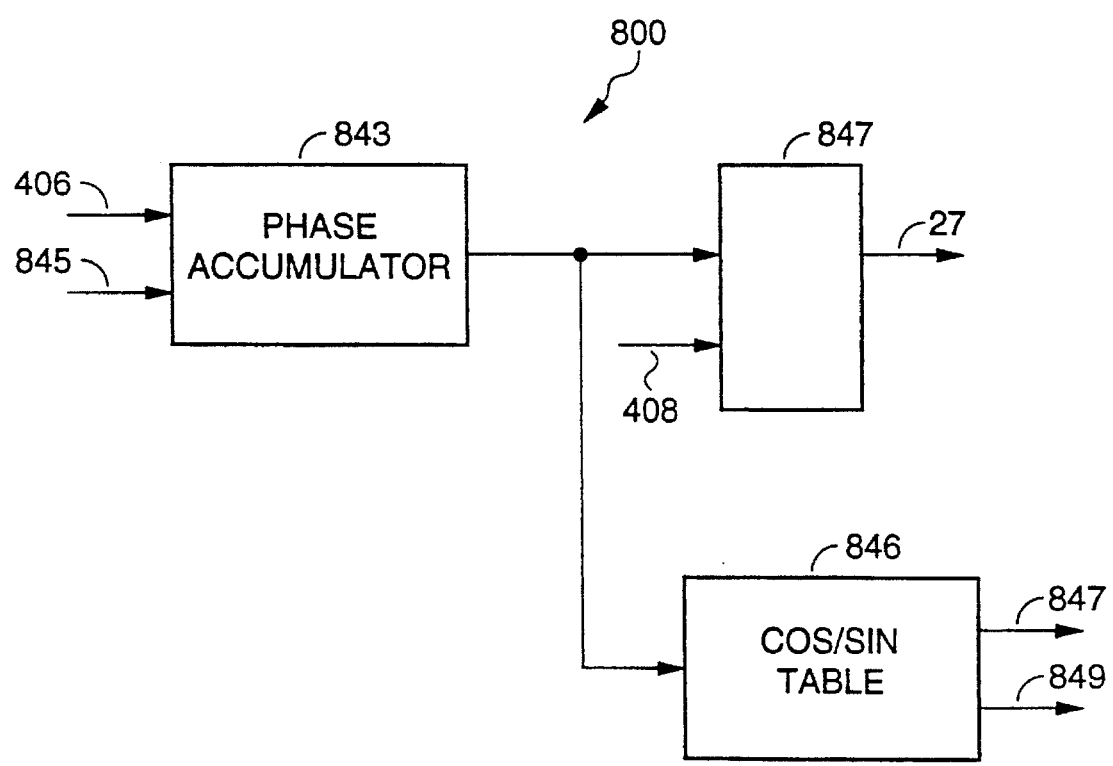
FIG. 21c is a block diagram of an L2 carrier tracking numerically-controlled oscillator.

Referring to FIG. 23A, there is shown a block diagram of an L2 carrier tracking loop network in accordance with a first aspect of the invention. The R2PS and R2PC error terms on lines 866 and 867 are seen to provided to a multiplier 890 through latches 892 and 893. The product term produced by multiplier 890 is provided to a second order tracking loop 753c having a circuit implementation substantially identical to that of the control loop 753a. The loop constants KL and KI are respectively loaded by the digital processor 25 into registers 894 and 895, through which the constants KL and KI are provided to the tracking loop 753c. The output of the tracking loop 753c impressed upon line 845 through output latch 897 is fed back to the phase accumulator 843 of the L2 carrier tracking NCO 800 (FIG. 21C).

As a consequence of the same W-code bit polarity of the error signal R2PS and R2PC, the W-code is effectively removed from the product term produced by multiplier 890. In addition, it is noted that the product of the quadrature components R2PS and R2PC yields an error term corresponding to the sine of the phase offset between the locally-generated L2 carrier phase and the phase of the received L2 signal. This technique advantageously improves signal to noise ratio of the demodulated L2 carrier by performing a signal squaring operation within the tracking loop 753c, and by integrating the L2 quadrature components over an interval corresponding to a single bit of the W-code.

Code-Aided L2 Demodulation Using Cross-Correlation of L1 and L2 Signals.

As was discussed above, the frequency disparity between the L1 and L2 signals causes each to experience a different phase delay during propagation through the ionosphere. The difference in delay between the L1 and L2 signals will vary in accordance with satellite elevation angle and atmospheric conditions, but will typically be on the order of several chips of the known P-code. In the L2 carrier demodulation technique of the invention described with reference to FIG. 24, quadrature components of the received L1 and L2 signals are aligned in phase without utilization of a variable delay element.

Figure 24:
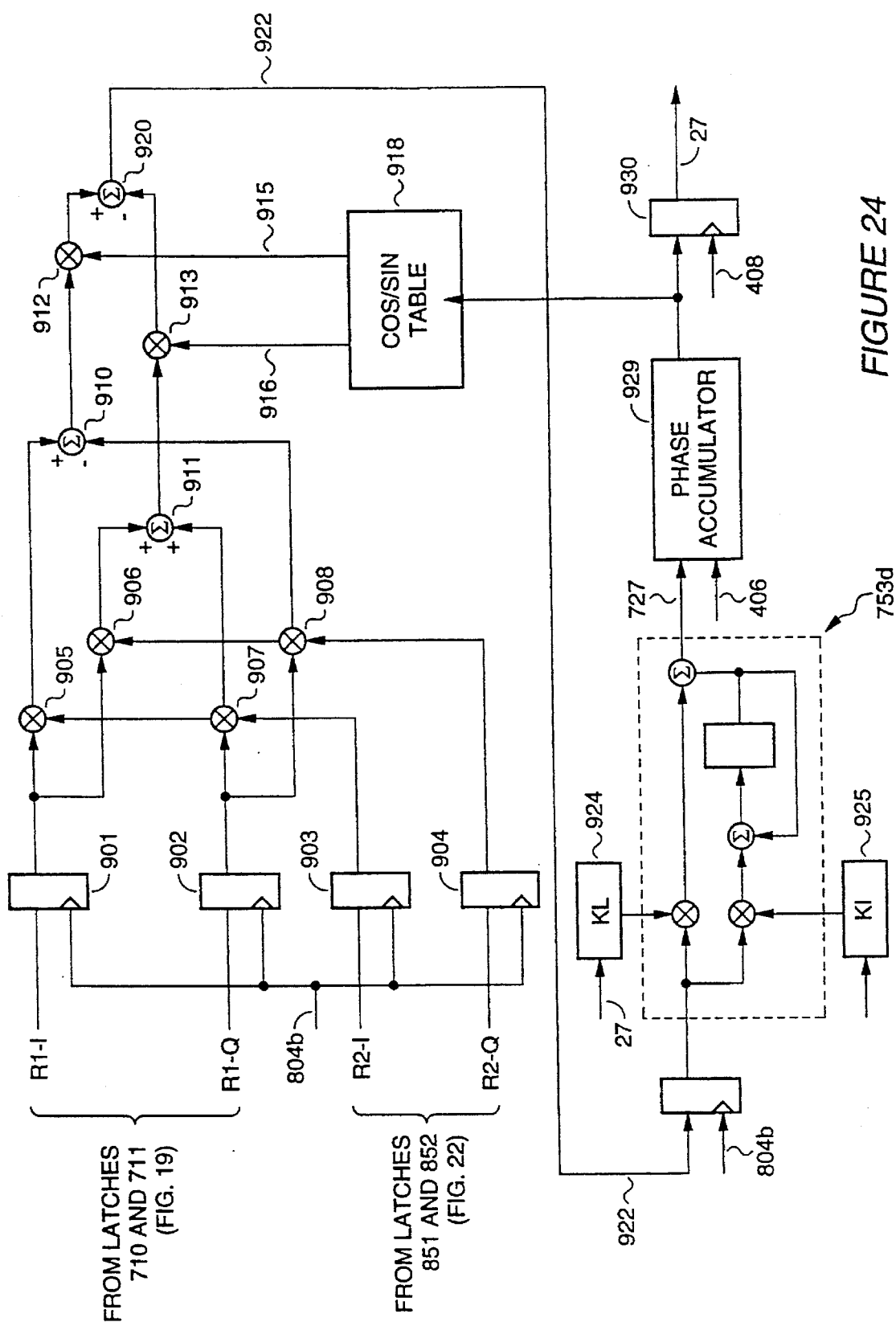
FIG. 24 is an L2-L1 difference tracking loop of the present invention.

Referring now to the L2-L1 difference tracking loop of FIG. 24, the quadrature signal components from latches 710 and 711 of the L1 P-channel correlator (FIG. 19) are provided to first and second input latches 901 and 902. Similarly, the quadrature signal components from latches 851 and 852 of the L2 P-channel correlator (FIG. 22) are supplied to third and fourth input latches 903 and 904. Even if a slight phase offset exists between the signal components arriving at latches 901-904, the complementary W-bit timing provided by line 804b ensures phase synchrony among the signals output by the latches 901-904. This phase alignment technique simplifies circuit architecture by obviating the need for a delay element to compensate for the variable delay between the received L1 and L2 signals.

The phase-aligned outputs of latches 901-904 are cross multiplied by digital multipliers 905-908 so as to effectively remove any W-code modulation carried by the received signals. The difference between the cross-multiplied outputs from multipliers 905 and 908 is then provided by digital subtractor 910, while the sum of the outputs of multipliers 906 and 907 is supplied by digital adder 911. The combined signals produced by subtractor 910 and adder 911 are then respectively multiplied at multipliers 912 and 914 by the sine (line 915) and cosine (line 916) of the phase difference between the locally-generated L1 and L2 carriers. The sine and cosine phase error terms are impressed upon lines 915 and 916 by a cosine/sine look-up table 918.

As is shown in FIG. 24, a digital subtractor 920 operates to apply an error signal to control input line 922 on the basis of the difference in the outputs produced by the multipliers 912 and 913. The control line 922 is coupled to an input of a second order control loop 753d via latch 923. In the embodiment of FIG. 24 the control loop 753d is substantially identical to the control loop 753a, and is provided with loop constant parameters KL and KI via registers 924 and 925 by the digital processor 25. The control loop 753d generates a control signal upon control signal output line 927 which is supplied to a phase accumulator 929. The resultant output of the phase accumulator 929 is utilized by the cosine/sine look-up table 918 to produce the quadrature phase error terms upon lines 915 and 916. Upon phase lock being established within the L2-L1 difference tracking loop of FIG. 24 the phase offset between the locally-generated L2 and L1 carriers may be read by digital processor 25 at one millisecond intervals from an output register 930 via bus 27.

Code-Aided L2 Demodulation Using Soft-Decision W-Code Bit Estimation.

Referring now to FIG. 23B, there is shown a block diagram of an L2 carrier tracking loop network in accordance with another aspect of the invention. The L2 carrier tracking loop is disposed to process the R1PC phase error term provided on line 734 by the L1 P-channel correlator 666 (FIG. 19), and the R2PC phase error term impressed upon line 867 by the L2 P-channel correlator (FIG. 22).

The R1PC and R2PC phase error terms on lines 734 and 867 are seen to provided to a multiplier 933 through latches 935 and 936. Again, even if a slight phase offset exists between the signal components arriving at latches 935–936, the complementary W-bit timing provided by line 804b ensures phase synchrony among the signals output by the latches 935–936. This phase alignment technique simplifies circuit architecture by obviating the need for a delay element to compensate for the variable delay between the received L1 and L2 signals. As a consequence of the identical W-code bit polarity of the error terms R1PC and R2PC, the W-code is effectively removed from the product term output by multiplier 933.

The product term produced by multiplier 933 is provided to a second order tracking loop 753e having a circuit implementation substantially identical to that of the control loop 753a. The loop constants KL and KI are respectively loaded by the digital processor 25 into registers 935 and 936, through which the constants KL and KI are provided to the tracking loop 753e. The output of the tracking loop 753e impressed upon line 845 through output latch 938 is fed back to the phase accumulator 843 of the L2 carrier tracking NCO 800 (FIG. 21C).

A principal advantage afforded by the implementation of FIG. 23B is that the R1PC is directly used by multiplier 933 in a "soft-decision" operation to remove the L2 W-code modulation carded by the R2PC signal. This approach improves the signal-to-noise ratio of the demodulated L2 carrier signal by avoiding the information loss associated with conventional methods of W-code removal employing a "hard-decision" process.

Optimal L2 Demodulation Motivated by Maximum-A-Posteriori (MAP) Estimation. Theory.

As was described in section II, another aspect of the invention contemplates an L2 demodulation technique believed to result in theoretically optimal signal to noise ratio in the absence of exact knowledge of the classified W-code. Referring again to section II, equation (8) may be expressed in a simplified manner as:

$$0 = \tanh(\sqrt{2}\ R1PC + R2PC) \times R2PS \qquad (9)$$

where R1PC, R2PC and R2PS are the quadrature components of the L1 and L2 signals identified in FIGS. 19 and 22.

Figure 25A:
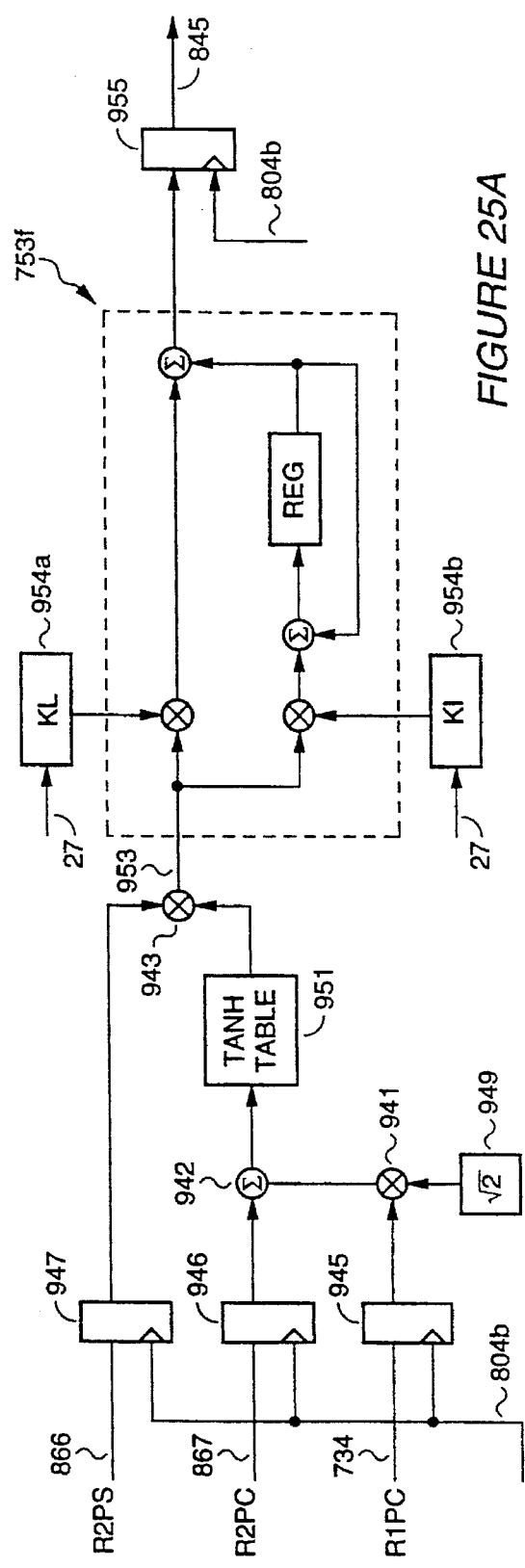
FIG. 25A shows a block diagram of an L2 carrier tracking loop network having a circuit realization motivated by statistical Maximum A Posteriori (MAP) estimation theory.

Referring to FIG. 25A, there is shown a block diagram of an L2 carrier tracking loop network having a circuit realization motivated by statistical Maximum A Posteriori (MAP) estimation theory. As shown in FIG. 25A, the R1PC, R2PC and R2PS phase error terms on lines 734, 867 and 866 are seen to be respectively provided to a first input multiplier 941, to an adder 942 and to a second input multiplier 943 through latches 945–947. Again, even if a slight phase offset exists between the signal components arriving at latches 945–947, the complementary W-bit timing provided by line 804b ensures phase synchrony among the signals output by the latches 945–947. As noted above, this phase alignment technique simplifies circuit implementation by obviating the need for a delay element to compensate for the variable delay between the received L1 and L2 signals.

After phase alignment within the latches 945–947, the R1PC signal is scaled at multiplier 941 by a square root of two scale factor provided by scaling circuit 949, and is then combined by the adder 942 with the R2PC signal. The output of the adder 942 is used as an index into TANH look-up table 951. The output of the look-up table 951 is cross-multiplied with the R2PS signal at multiplier 943 in order to provide an input control signal upon line 953 from which the W-code has been effectively removed.

The control signal impressed upon line 953 is utilized to drive a second order tracking loop 753f having a circuit implementation substantially identical to that of the control loop 753a. The loop constants KL and KI are respectively loaded by the digital processor 25 into registers 954a and 954b, through which the constants KL and KI are provided to the tracking loop 753f. The output of the tracking loop 753f impressed upon line 845 through output latch 955 is fed back to the phase accumulator 843 of the L2 carrier tracking NCO 800 (FIG. 21C).

As is indicated by FIG. 21C, the resultant output of the phase accumulator 843 is utilized by the cosine/sine look-up table 846 to produce the quadrature phase error terms upon lines 847 and 849. Upon phase lock being established within the tracking loop corresponding defined by the circuit networks of FIGS. 21C and 25A, the phase of the locally-generated L2 carrier may be read by digital processor 25 at one millisecond intervals from output register 847 via bus 27. In this way L2 carrier tracking performance is optimized by utilizing information from both the received L1 and L2 signals in accordance with statistical MAP estimation theory.

Modified Maximum-A-Posteriori (MAP) Optimal L2 Demodulation.

As mentioned in section II, a simplified realization of the MAP optimal L2 demodulation technique is made possible through linear approximation of the TANH function. Specifically, for relatively low signal-to-noise ratio over the W-code bandwidth of interest, minimal error is introduced through utilization of the following linear approximation:

$$\sin h(x) = x \text{ for small } x \qquad (10)$$

The simplified form of the MAP estimator equation for this near optimum estimator is then given by:

$$0 = (\sqrt{2}\ R1PC + R2PC) \times R2PS \qquad (11)$$

where R1PC, R2PC and R2PS denote the previously defined quadrature components of L1 and L2 signals.

Figure 25B:
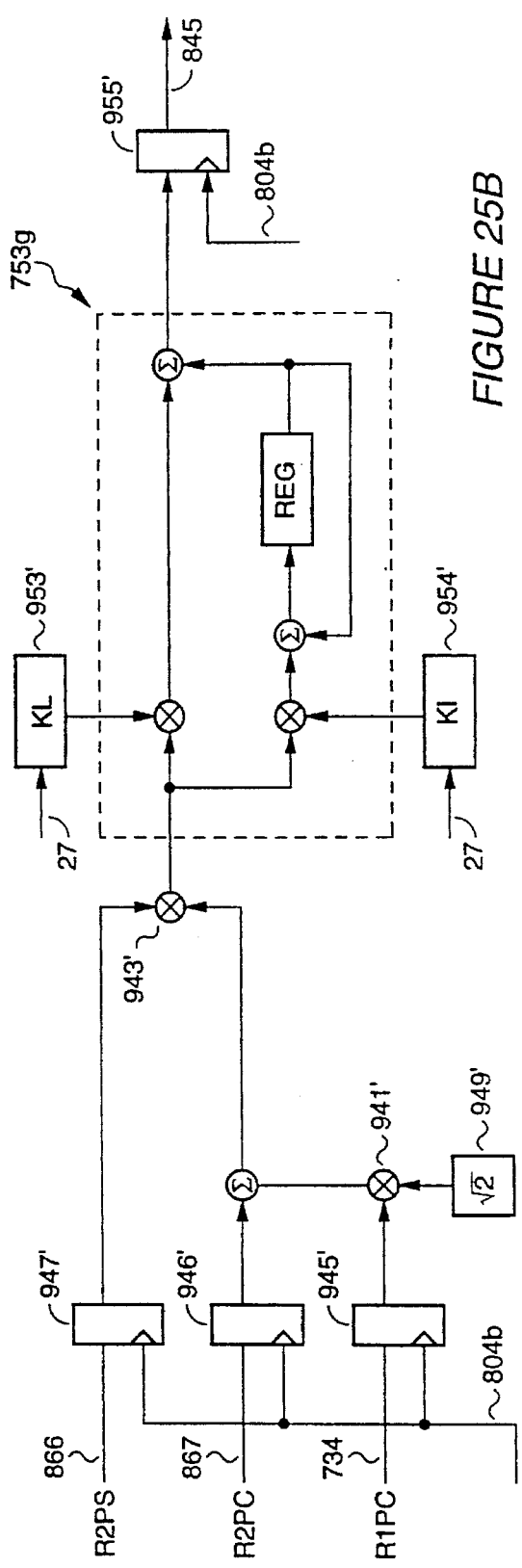
FIG. 25B is a block diagram of an L2 carrier tracking loop network realized in accordance with the near optimal statistical MAP L2 demodulation expression

FIG. 25B is a block diagram of an L2 carrier tracking loop network realized in accordance with the near optimal statistical MAP L2 demodulation expression of equation (11). As shown in FIG. 25B, the R1PC, R2PC and R2PS phase error terms on lines 734, 867 and 866 are seen to be respectively provided to a first input multiplier 941', to an adder 942' and to a second input multiplier 943' through latches 945'–947'. Again, even if a slight phase offset exists between the signal components arriving at latches 945'–947', the complementary W-bit timing provided by line 804b ensures phase synchrony among the signals output by the latches 945'–947'. As noted above, this phase alignment technique simplifies circuit implementation by obviating the need for a delay dement to compensate for the variable delay between the received L1 and L2 signals.

After phase alignment within the latches 945'–947', the R1PC signal is scaled at multiplier 941' by a square root of two scale factor provided by scaling circuit 949', and is then combined by the adder 942' with the R2PC signal. The output of the adder 942' is cross-multiplied with the R2PS signal at multiplier 943' in order to provide an input control signal upon line 953' from which the W-code has been effectively removed.

The control signal impressed upon line 953' is utilized to drive a second order tracking loop 753g substantially identical to the tracking loop 753f. The loop constants KL and KI are respectively loaded by the digital processor 25 into registers 954a' and 954b', through which the constants KL and KI are provided to the tracking loop 753g. The output of the tracking loop 753g impressed upon line 845 through output latch 955' is fed back to the phase accumulator 843 of the L2 carrier tracking NCO 800 (FIG. 21C).

As is indicated by FIG. 21C, the resultant output of the phase accumulator 843 is utilized by the cosine/sine look-up table 846 to produce the quadrature phase error terms upon lines 847 and 849. Upon phase lock being established within the tracking loop corresponding defined by the circuit networks of FIGS. 21C and 25B, the phase of the locally-generated L2 carrier may be read by digital processor 25 at one millisecond intervals from output register 847 via bus 27. In this way L2 carrier tracking performance is significantly improved by utilizing information from both the received L1 and L2 signals in accordance with statistical MAP estimation theory. In addition, the L2 tracking loop network of FIG. 25B offers the further advantage of a relatively simple circuit implementation.

Various modifications to the embodiments disclosed herein may occur to those skilled in the art without departing from the true spirit and scope of the invention as defined by the appended claims.

What is claimed is:

1. A method of processing L1 and L2 signals received in a global positioning system (GPS), each of said L1 and L2 signals including a unique frequency carrier with a known pseudo-random P-code and unknown code modulated thereon, said method comprising the steps of:

demodulating each of the received L1 and L2 signals with a locally generated replica of their respective carrier signals and with locally generated replicas of the known P-code that is contained therein to generate first and second modulated L1 signals and first and second demodulated L2 signals;

separately integrating the first and second demodulated L1 signals and the first and second demodulated L2 signals over a time period equal in length to a plurality of P-code cycles to generate first and second integrated demodulated L1 signals and first and second integrated demodulated L2 signals;

correlating the second integrated demodulated L1 signal with said second integrated demodulated L2 signal in order to provide a correlated L2 signal, and correlating the second integrated demodulated L1 signal with the first integrated demodulated L1 signal in order to generate an L1 tracking signal, and adjusting the phases of the locally generated carrier signal and P-code replicas relative to the received L1 and L2 signals based upon said L1 tracking signal and upon said correlated L2 signal, said locally generated carrier and P-code phases being useable to recover at least said unique L2 frequency carrier with favorable signal to noise ratio.

2. The method of claim 1 further including the step of providing said locally generated L2 carrier signal replica by adjusting phase of an L2 channel oscillator signal in accordance with said correlated L2 signal.

3. The method of claim 1 wherein said step of integrating includes the step of performing said integration over a time period substantially equivalent to a period of an unknown modulation code.

4. The method of claim 1 wherein said step of integrating includes the step of performing said integration over a time period equal to approximately twenty cycles of said P-code.

5. The method of claim 1, including:

delaying said second integrated demodulated L1 signal relative to said first and second integrated demodulated L2 signals;

said step of correlating the second integrated demodulated L1 signal with said second integrated demodulated L2 signal including correlating the delayed second integrated demodulated L1 signal with said second integrated demodulated L2 signal to generate the correlated L2 signal.

6. In the method of claim 1 wherein the received L1 signal additionally contains a known C/A-code modulated on its L1 carrier in phase quadrature with the P-code modulated thereon, the phase adjusting step including the steps of:

locally generating a replica of the C/A-code, and varying phase of said locally generated C/A code replica until said locally generated C/A code replica is in phase with that modulated on the received L1 signal.

7. A method of processing L1 and L2 signals received in a global positioning system (GPS), each of said L1 and L2 signals including a unique frequency carrier with a known pseudo-random P-code and unknown code modulated thereon, said method comprising the steps of:

demodulating each of the received L1 and L2 signals with a locally generated replica of their respective carrier signals and with locally generated replicas of the known P-code contained therein to generate first and second demodulated L1 signals and first and second demodulated L2 signals;

separately integrating the first and second demodulated L1 signals and the first and second demodulated L2 signals over a time period equal in length to a plurality of P-code cycles, to generate first and second integrated demodulated L1 signals and first and second integrated demodulated L2 signals;

correlating the first integrated demodulated L1 signal with the second integrated demodulated L1 signal in order to provide a correlated L1 signal, and correlating the second integrated L1 signal with the first integrated demodulated L2 signal in order to generate an L2 tracking signal, and adjusting the phases of the locally generated carrier signal and P-code replicas relative to the received L1 and L2 signals based upon said L2 tracking signal and upon said correlated L1 signal, said locally generated carrier and P-code phases being useable to recover at least said unique L1 frequency carrier.

8. A method of processing L1 and L2 signals received in a global positioning system (GPS), each of said L1 and L2 signals including a unique frequency carrier with a known pseudo-random P-code and unknown code modulated thereon, said method comprising the steps of:

demodulating the received L1 signal with a locally generated replica of its respective carrier signal and with locally generated replicas of the known P-code contained therein to generate first and second demodulated L1 signals;

demodulating the received L2 signal with a locally generated replicas of the known P-code contained therein to generate first and second pre-demodulated L2 signals.;

separately integrating the first and second demodulated L1 signals over a predefined time period equal in length to a plurality of P-code cycles to generate first and second integrated demodulated L1 signals;

correlating the second integrated demodulated L1 signal with the first integrated demodulated L1 signal in order to generate an L1 P-code track signal;

providing said first and second pre-demodulated L2 signals and said second integrated demodulated L1 signal to a feedback loop network operative to generate an estimate of said L2 carrier signal in response thereto; and adjusting the phases of the locally generated carrier signal and P-code replicas relative to the received L1 and L2 signals based upon said L1 P-code track signal and said estimate of said L2 carrier signal, said phases of said locally generated carrier signal and P-code replicas being useable to recover at least said unique L2 frequency carrier.

9. The method of claim 8 further including the step of, within said feedback loop network, separately correlating said first pre-demodulated L2 signal with an estimate of said L2 carrier signal and with a quadrature-phase estimate of said L2 carrier signal and separately integrating results of the separate correlations over said predefined time period to generate first and second integrated demodulated L2 signals.

10. The method of claim 9 further including the step of, within said feedback loop network, multiplying the first and second integrated demodulated L2 signals in order to form a first loop control signal.

11. The method of claim 9 further including the steps of:

weighing said second integrated demodulated L1 signal by a weighing factor so as to produce a weighted integrated demodulated L1 signal;

combining said weighted integrated demodulated L1 signal with said first integrated demodulated L2 signal to generate a combined integrated demodulated L1/L2 signal, and multiplying the combined integrated demodulated L1/L2 signal with the second integrated demodulated L2 signal to form an L2 channel oscillator control signal; and adjusting phase of said estimate of said L2 carrier signal in accordance with said L2 channel oscillator control signal.

12. The method of claim 11, said combining step including adding said weighted integrated demodulated L1 signal with said first integrated demodulated L2 signal, and scaling the result by a scale factor to generate a combined integrated demodulated L1/L2 signal, wherein said scaling is performed in accordance with a hyperbolic tangent function.

13. A method of processing L1 and L2 signals received in a global positioning system (GPS), each of said L1 and L2 signals including a unique frequency carrier with a known pseudo-random P-code and unknown code modulated thereon, said method comprising the steps of:

demodulatina the received L1 signal with a locally generated replica of its respective carrier signal and with locally generated replicas of the known P-code contained therein to generate first and second demodulated L1 signals:

demodulating the received L2 signal with a locally generated replicas of the known P-code contained therein to generate first and second pre-demodulated L2 signals:

separately integrating the first and second demodulated L1 signals over a predefined time period equal in length to a plurality of P-code cycles to generate first and second integrated demodulated L1 signals;

separately correlating the first pre-demodulated L2 signal with estimates of in-phase and quadrature-phase L2 carrier signals, separately integrating the results of the separate correlations over said predefined time period to generate first and second integrated demodulated L2 signals, and, based upon a predefined function of said first and second integrated demodulated L2 signals in combination with said second integrated demodulated L1 signal, providing said estimates of in-phase and quadrature-phase L2 carrier signals;

correlating the second pre-demodulated L2 signal with the estimate of the in-phase L2 carrier signal and integrating the result to generate a third integrated demodulated L2 signal;

correlating the third integrated demodulated L2 signal with the second integrated demodulated L1 signal in order to provide an L2 P-code track signal, and correlating the second integrated demodulated L1 signal with the first integrated demodulated L1 signal in order to generate an L1 P-code track signal; and adjusting the phases of the P-code replicas relative to the received L1 and L2 signals based upon said L1 and L2 P-code track signals.

14. The method of claim 13 further including the step of forming said predefined function by:

weighing the the second integrated demodulated L1 signal by a weighing factor in order to provide a weighted integrated demodulated L1 signal; and signal so as to provide a first phase adjustment signal; and combining said weighted integrated demodulated L1 signal with said first integrated demodulated L2 signal to generate a combined integrated demodulated L1/L2 signal, and multiplying the combined integrated demodulated L1/L2 signal with the second integrated demodulated L2 signal to form an L2 channel oscillator control signal; and said estimates providing step including adjusting phase of said estimates of in-phase and quadrature-phase L2 carrier signals in accordance with said L2 channel oscillator control signal.

15. The method of claim 14 said combining step including adding said weighted integrated demodulated L1 signal with said first integrated demodulated L2 signal, and scaling the result by a scale factor to generate a combined integrated demodulated L1/L2 signal, wherein said scaling is performed in accordance with a hyperbolic tangent function.

16. A receiver for processing L1 and L2 signals received in a global positioning system (GPS), each of said L1 and L2 signals including a unique frequency carrier with a known pseudo-random P-code and unknown code modulated thereon, said receiver comprising:

means for demodulating each of the received L1 and L2 signals with a locally generated replica of their respective carrier signals and with locally generated replicas of the known P-code contained therein to generate first and second demodulated L1 signals and first and second demodulated L2 signals;

means for separately integrating the first and second demodulated L1 signals and the first and second demodulated L2 signals over a time period equal in length to a plurality of P-code cycles to generate first and second integrated demodulated L1 signals and first and second integrated demodulated L2 signals;

first means for correlating the second integrated demodulated L1 signal with said second integrated demodulated L2 signal in order to provide a correlated L2 signal, and second means for correlating the second integrated demodulated L1 signal with the first integrated demodulated L1 signal in order to generate an L1 tracking signal; and phase adjusting means for adjusting the phases of the locally generated carrier signal and P-code replicas relative to the received L1 and L2 signals based upon said L1 tracking signal and upon said correlated L2 signal, said locally generated carrier and P-code phases being useable to determine location of said receiver.

17. The receiver of claim 16 further including means for providing the recovered L2 carrier frequency by generating an L2 channel oscillator output signal at approximately said L2 carrier frequency and means for adjusting phase of said L2 channel oscillator output signal in accordance with said correlated L2 signal.

18. The receiver of claim 16 wherein said means for integrating includes means for performing said integration over a time period substantially equivalent to a period of an unknown modulation code.

19. The receiver of claim 16 wherein said means for integrating includes means for performing said integration over a time period equal to approximately twenty cycles of said P-code.

20. The receiver of claim 18 wherein said means for integrating includes means for delaying said second integrated demodulated L1 signal relative to said first and second integrated demodulated L2 signals;

said first correlating means correlates the delayed second integrated demodulated L1 signal with said second integrated L2 signal to generate the correlated L2 signal.

21. In the receiver of claim 16 wherein the received L1 signal additionally contains a known C/A-code modulated on its L1 carrier in phase quadrature with the P-code modulated thereon, the phase adjusting means including:

means for locally generating a replica of the C/A-code, and means for varying phase of said locally generated C/A code replica until said locally generated C/A code replica is in phase with that modulated on the received L1 signal.

22. A receiver for processing L1 and L2 signals received in a global positioning system (GPS), each of said L1 and L2 signals including a unique frequency carrier with a known pseudo-random P-code and unknown code modulated thereon, said receiver comprising:

means for demodulating each of the received L1 and L2 signals with a locally generated replica of their respective carrier signals and with locally generated replicas of the known P-code contained therein to generate first and second demodulated L1 signals and first and second demodulated L2 signals;

means for separately integrating the first and second demodulated L1 signals and the first and second demodulated L2 signals over a time period equal in length to a plurality of P-code cycles to generate first and second integrated demodulated L1 signals and first and second integrated demodulated L2 signals;

first means for correlating the first integrated demodulated L1 signal with the second integrated demodulated L1 signal in order to provide a correlated L1 signal, and second means for correlating the second integrated L1 signal with the second integrated demodulated L2 signal in order to generate an L2 tracking signal, and means for adjusting the phases of the locally generated carrier signal and P-code replicas relative to the received L1 and L2 signals based upon said L2 tracking signal and upon said correlated L1 signal.

23. A receiver for processing L1 and L2 signals received in a global positioning system (GPS), each of said L1 and L2 signals including a unique frequency carrier with a known pseudo-random P-code and unknown code modulated thereon, said receiver comprising:

means for demodulating the received L1 signal with a locally generated replica of its respective carrier signal and with locally generated replicas of the known P-code contained therein to generate first and second demodulated L1 signals;

means for demodulating the received L2 signal with a locally generated replicas of the known P-code contained therein to generate first and second pre-demodulated L2 signals means for separately integrating the first and second demodulated L1 signals over a predefined time period equal in length to a plurality of P-code cycles to generate first and second integrated demodulated L1 signals;

means for correlating the second integrated demodulated L1 signal with the first integrated demodulated L1 signal in order to generate an L1 P-code track signal;

means for providing said first and second pre-demodulated L2 signals and said second integrated demodulated L1 signal to a feedback loop network operative to generate an estimate of said L2 carrier signal in response thereto; and means for adjusting the phases of the locally generated carrier signal and P-code replicas relative to the received L1 and L2 signals based upon said L1 P-code track signal and upon said estimate of said L2 carrier signal.

24. The receiver of claim 23 wherein said feedback loop network includes;

means for separately correlating said first pre-demodulated L2 signal with an estimate of said L2 carrier signal and with a quadrature-phase estimate of said L2 carrier signal, and means for separately integrating results of the separate correlations over said predefined time period to generate first and second integrated demodulated L2 signals.

25. The receiver of claim 24 further including, within said feedback loop network, means for multiplying the first and second integrated demodulated L2 signals in order to form a first loop control signal.

26. The receiver of claim 24 including:

means for weighing said second integrated demodulated L1 signal by a weighing factor so as to produce a weighted integrated demodulated L1 signal;

means for combining said weighted integrated demodulated L1 signal with said first integrated demodulated L2 signal to generate a combined integrated demodulated L1/L2 signal, and multiplying the combined integrated demodulated L1/L2 signal with the second integrated demodulated L2 signal to form an L2 channel oscillator control signal: and said phase adjusting means adjusting the phase of said estimate of said L2 carrier signal in accordance with said L2 channel oscillator control signal.

27. The receiver of claim 26 including:

said combining means including and adder for adding said weighted integrated demodulated L1 signal with said first integrated demodulated L2 signal, and scaling the result by a scale factor to generate a combined integrated demodulated L1/L2 signal, wherein said scaling is performed in accordance with a hyperbolic tangent function.

28. A receiver for processing L1 and L2 signals received in a global positioning system (GPS), each of said L1 and L2 signals including a unique frequency carrier with a known pseudo-random P-code and unknown code modulated thereon, said receiver comprising:

means for demodulating the received L1 signal with a locally generated replica of its respective carrier signal and with locally generated replicas of the known P-code contained therein to generate first and second demodulated L1 signals;

means for demodulating the received L2 signal with a locally generated replicas of the known P-code contained therein to generate first and second pre-demodulated L2 signals;

means for separately integrating the first and second demodulated L1 signal over a predefined time period equal in length to a plurality of P-code cycles to generate first and second integrated demodulated L1 signals;

means for separately correlating the first pre-demodulated L2 signal with estimates of in-phase and quadrature-phase L2 carrier signals, for separately integrating the results of the separate correlations over said predefined time period to generate first and second integrated demodulated L2 signals, and, based upon a predefined function of said first and second integrated demodulated L2 signals in combination with said second integrated demodulated L1 signal, for providing said estimates of the in-phase and quadrature-phase L2 carrier signals;

means for correlating the second pre-demodulated L2 signal with the estimate of the in-phase L2 carrier signal integrating the result to generate a third integrated demodulated L2 signal:

means for correlating the third integrated demodulated L2 signal with the second integrated demodulated L1 signal in order to provide an L2 P-code track signal, and for correlating the second integrated demodulated L1 signal with the first integrated demodulated L1 signal in order to generate an L1 P-code track signal; and means for adjusting the phases of the P-code replicas relative to the received L1 and L2 signals based upon said L1 and L2 P-code track signals.

29. The receiver of claim 28 including means for forming said predefined function comprising:

means for weighing the second integrated demodulated L1 signal by a weighing factor in order to provide a weighted integrated demodulated L1 signal;

means for combining said weighted integrated demodulated L1 signal with said first integrated demodulated L2 signal to generate a combined integrated demodulated L1/L2 signal, and for multiplying the combined integrated demodulated L1/L2 signal with the second integrated demodulated L2 signal to form an L2 channel oscillator control signal: and said estimates providing means including means for adjusting phase of said estimates of in-phase and quadrature-phase L2 carrier signals in accordance with said L2 channel oscillator control signal.

30. The receiver of claim 29 said means for combining includes means for adding said weighted integrated demodulated L1 signal with said first integrated demodulated L2 signal, and for scaling the result by a scale factor to generate a combined integrated demodulated L1/L2 signal, wherein said scaling is performed in accordance with a hyperbolic tangent function.

* * * * *